United States Patent [19]

Eastin

[11] Patent Number: 4,512,794
[45] Date of Patent: Apr. 23, 1985

[54] MANUFACTURING AND USING NITROGEN FERTILIZER SOLUTIONS ON A FARM

[76] Inventor: John A. Eastin, P.O. Box 389, Lincoln, Nebr. 69140

[21] Appl. No.: 507,721

[22] Filed: Jun. 23, 1983

Related U.S. Application Data

[60] Division of Ser. No. 379,551, May 18, 1982, Pat. No. 4,427,434, which is a continuation-in-part of Ser. No. 100,825, Dec. 6, 1979, abandoned, which is a continuation of Ser. No. 824,289, Aug. 15, 1977, abandoned, which is a continuation of Ser. No. 728,788, Oct. 1, 1976, abandoned, which is a division of Ser. No. 581,050, May 27, 1975, abandoned.

[51] Int. Cl.³ .......................... C05C 7/00; C05C 3/00
[52] U.S. Cl. ........................................ 71/54; 71/1;
71/37; 71/39; 71/49; 71/50; 71/53; 71/56;
71/57; 71/58; 71/59; 71/60; 71/61; 71/63;
71/64.10; 71/64.08; 423/359; 423/395;
423/397; 423/403; 423/404; 423/407
[58] Field of Search .................. 71/1, 37, 39, 49, 50,
71/53, 54, 56–61, 63, 64.8, 64.10; 423/359, 395,
396, 403

[56] References Cited

U.S. PATENT DOCUMENTS 1,541,808 6/1925 Greathouse ...................... 423/396
2,110,431 3/1938 Voogd ............................. 423/396

*Primary Examiner*—Arthur P. Demers
*Attorney, Agent, or Firm*—Vincent L. Carney

[57] ABSTRACT

To make non-pressure nitrogenous fertilizer solutions, nitrogen oxides are prepared in a continuous process by burning ammonia in contact with a cobalt oxide catalyst started by an electric arc without pre-heating the gases. This burning forms nitrogen oxides which are reacted under negative pressure in a two-stage system. Nitric acid is formed in the first stage from a portion of the oxides by oxidizing them to nitrogen dioxide and reacting the nitrogen dioxide with water. In the second stage, the remaining nitrogen oxides are reacted at a pH between 8.0 and 8.4 in a gas-liquid contacting apparatus with an ammonium hydroxide reaction liquid, formed by mixing ammonia and water. The ammonium nitrite solution formed in the second stage is mixed with the nitric acid at a pH below 0.2, resulting in a solution of acidic ammonium nitrate to be flowed to the fields with irrigation water.

25 Claims, 8 Drawing Figures

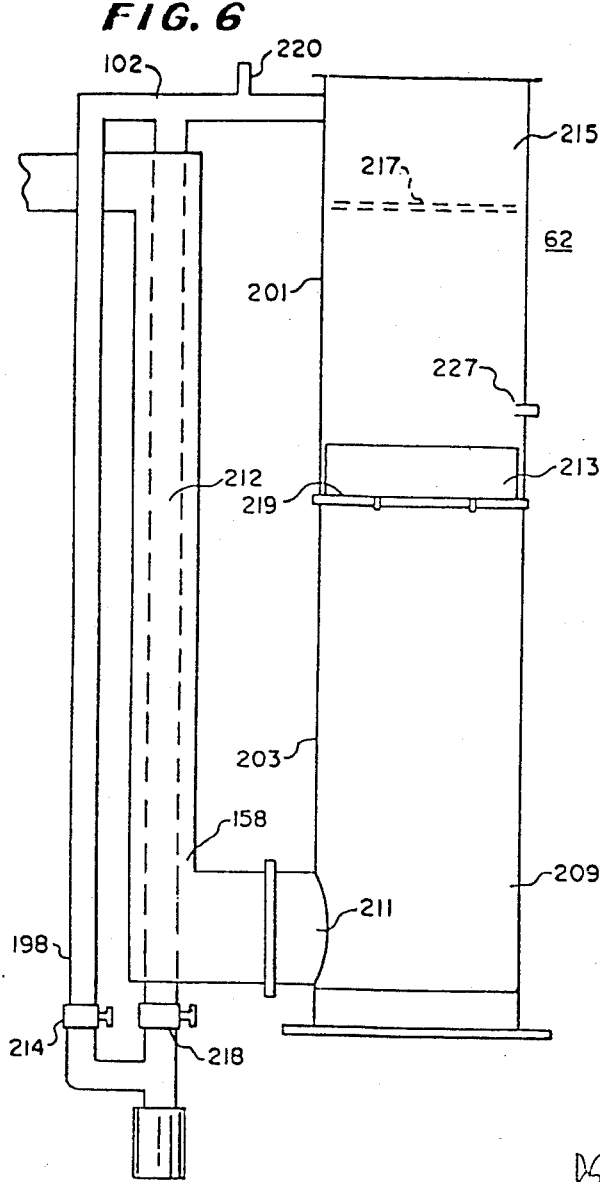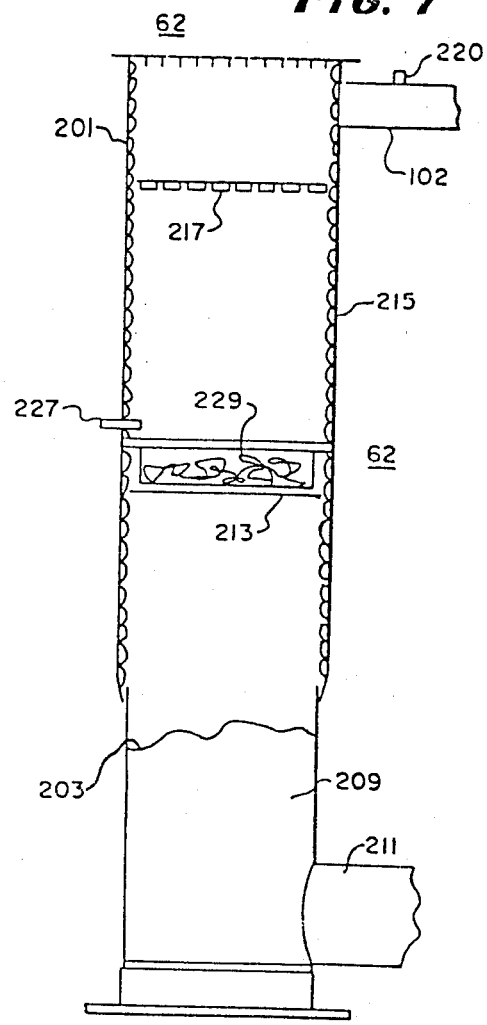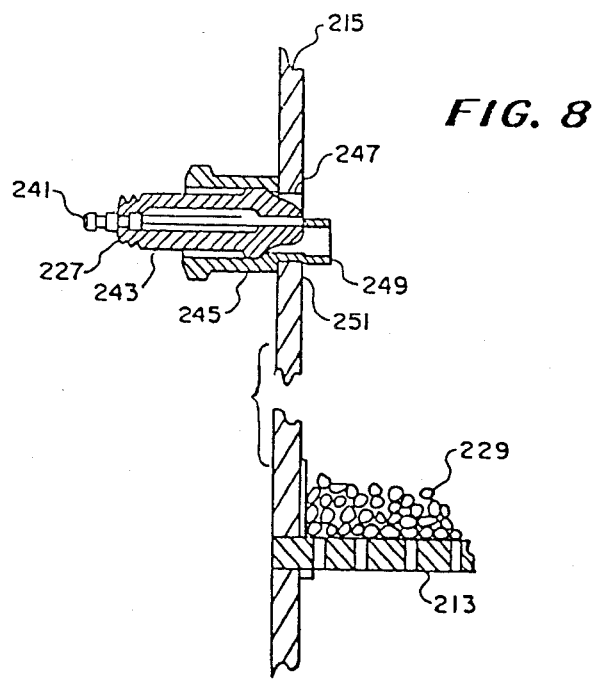

MANUFACTURING AND USING NITROGEN FERTILIZER SOLUTIONS ON A FARM

RELATED CASES

This application is a division of application Ser. No. 379,551, filed May 18, 1982, now U.S. Pat. No. 4,427,434 which is a continuation-in-part of U.S. application Ser. No. 100,825 filed Dec. 6, 1979, now abandoned which is a continuation of Ser. No. 824,289, filed Aug. 15, 1977, now abandoned which is a continuation of Ser. No. 728,788, filed Oct. 1, 1976, now abandoned which is a division of Ser. No. 581,050, filed May 27, 1975, now abandoned.

BACKGROUND OF THE INVENTION

This invention relates to methods and apparatus for producing nitrogen fertilizer solutions.

It is known that ammonium and nitrate ions are the major nitrogen forms absorbed by plant roots. It has been described in *Biological Review,* 1978. 55:465-510, that each ion may produce different yield and physiological responses within plant and cropping systems. Moreover, certain common crops and categories of different crops respond to different ratios of the two ions in the soil solution by providing increased plant growth and yield when the proper ion ratio exists in the soil solution during the crop growth period. For example, corn grows most rapidly with 1:3 ammonium-nitrate ion ratio in a normal temperature soil solution while tomatoes grow most efficiently with a large preponderance of nitrate nitrogen in the soil solution.

It is thus known to be beneficial to apply nitrate fertilizers to crops and to exercise control of the ammonium:nitrate ion ratio in the soil solution of a particular crop in accordance with that crop's needs.

The nitrogen fertilizer industry, in most countries, uses anhydrous ammonia as a principal component. This is because anhydrous ammonia: (1) has relatively low initial cost; (2) is the raw material for other synthetic nitrogen fertilizers; (3) has high nitrogen content, the content being approximately eighty-two percent (82%) by weight; and (4) has physical characteristics which make long distance pipeline, rail and truck transport efficient.

Anhydrous ammonia is a liquefied gas and because of that it has the several disadvantages under some circumstances, such as: (1) requiring special storage and handling facilities which are so expensive as to limit storage of anhydrous ammonia at the farm level and the local retail level; (2) requiring specialized subsurface application equipment to avoid ammonia loss at application time; (3) not being suitable for application in irrigation waters because it results in calcium carbonate deposits in the irrigation equipment and prohibitive amounts of fertilizer nitrogen are lost to the atmosphere through volatilization; (4) the time during a cropping season when it can be applied is limited because of the subsurface application requirements; and (5) because it must be applied at certain times, logistical problems and economic burdens are created in the industry.

One of the economic problems occurs because many soils, and especially coarser irrigated soils, cannot hold enough nitrogen applied as a single preplant ammonia application to sustain economic crop yields. Thus, it is necessary to apply split applications of nitrogen fertilizer. The time during the crop cycle when ammonia can be side dressed as a split application is limited by the growth of the crop plants because the operation requires knifing the ammonia gas into the soil.

It is known to use non-pressure nitrogen solutions to reduce some of these difficulties because they adapt readily to simple handling, storage and application methods. Moreover, the application of non-pressure fertilizer nitrogen solutions can be accomplished in concert with crop needs and this elicits a better crop growth response for each unit of applied nitrogen than the normal method of applying nitrogen in a concentrated ammonia band in the soil at the beginning of or shortly after the start of a crop cycle.

Non-pressure nitrogen solutions can be applied to the crop as a top dressing mechanically or in water used to irrigate the crop so it can be applied in a practical manner as the crop needs nitrogen.

However, non-pressure nitrogen solution fertilizers manufactured and applied by prior art techniques have a disadvantage in that a delivered unit of nitrogen as non-pressure nitrogen solution costs nearly double that for nitrogen as anhydrous ammonia. There have been many prior art attempts to reduce the cost of non-pressure nitrogen solutions.

In the prior art, one commercial system for providing non-pressure nitrogen fertilizer solutions for farm use consists of producing a relatively concentrated ammonium nitrate solution and blending it with a urea solution for shipment to dealers with subsequent distribution to and use at the farm level. The normal solution sold to the farmer contains from 28% to 32% nitrogen by weight, which is a low concentration product for long distance transportation. It must also be handled through a multi-tier distribution system.

The ammonium nitrate solution is produced by oxidizing ammonia with air, in the presence of a catalyst, to nitrogen oxide, oxidizing the nitrogen oxide to nitrogen dioxide and absorbing the nitrogen dioxide in water to produce nitric acid. In some prior art embodiments, this process is carried out at high pressure to make the desired acid concentration and reduce the size of the nitrogen oxide conversion and absorption system. Some systems include 30 to 35 stages of oxide conversion and absorption. In some systems, the concentrated nitric acid is reacted with ammonia to form an ammonium nitrate solution.

These commercial processes have the disadvantages of: (1) being expensive; (2) having considerable air pollution hazard; and (3) resulting in an expensive product. The cost of the product is increased for several reasons, such as: (1) the cost of making concentrated nitric acid and concentrated urea solutions is high; (2) there is cost in controlling atmospheric pollution; (3) there are substantial raw material losses in the manufacturing process; and (4) transporting and distributing a low concentration 28% to 32% nitrogen product over long distances to market is expensive.

In another prior art process, nitrogen is separated from the exhaust of tractors or other engines on a farm and the nitrogen is used as top dressing or for combination with other materials to form nitrogenous fertilizers. These processes are described in U.S. Pat. Nos. 2,943,419, 2,947,112 and 3,099,898.

These processes have the disadvantages of: (1) being limited in the amount of fertilizer obtainable; (2) being obtainable at only certain times; (3) producing undesirable nitrite nitrogen in the end product; (4) being limited in capacity to produce specific fertilizer nitrogen forms for cropping situations where that is desired; (5) being limited in the amount of fertilizer that can be produced economically by the amount of exhaust available from tractors or other engines while they are used for other purposes and being obtainable only after such use unless fuel is wasted by using the tractors or engines only to produce exhaust; and (6) requiring expensive and complicated apparatus to effect their reduction to practice.

Still another prior art process uses a multi-purpose irrigation-hydroelectric project as: (1) a base for manufacturing nitrogen solution fertilizer; (2) a vehicle for delivering said fertilizer to farms; (3) a means for correcting soil and water alkalinity problems of irrigated farms with nitrogen fertilizer; and (4) a means of fertilizing irrigated crops with nitrogen fertilizer.

The hydroelectric power not used for normal community use is used to prepare ammonia in a conventional manner. The ammonia is then partially oxidized, the remainder of the gas stream is mixed with the oxides formed in the partial oxidation and the mixture is absorbed in water to make a nitrogen solution fertilizer. Alternatively, electricity is used to make nitrogen oxides by the electric arc process and the oxides of nitrogen treated to make a nitrogen solution fertilizer. This process is described in U.S. Pat. Nos. 2,028,172 and 2,088,869.

This process has the disadvantages of: (1) not being suitable for use on individual farms or local sites serving only a few farms and thus being limited in application; (2) causing some damage in use; and (3) being inefficient in several respects.

Firstly, the process of U.S. Pat. Nos. 2,028,172 and 2,088,869 is not suitable for use on individual farms or local sites serving only a few farms and thus is limited in application for several reasons such as: (1) it is applicable only to large-scale, multi-purpose irrigation-hydroelectric projects; (2) it requires large-scale, multi-purpose dam sites for water and power and thus consideration of too large a number of individual farm's separate needs; (3) it does not permit practical tailoring of the ions produced to specific crop needs unless the same crop is used over a wide area which causes difficulties with diseases and insects; and (4) it requires the handling and conversion of nitrogen oxides at a central irrigation-hydroelectric dam site.

Secondly, the process of U.S. Pat. Nos. 2,028,178 and 2,088,869 causes damage in use because: (1) it causes extensive groundwater pollution; (2) it requires the transportation in open ditches of corrosive and environmentally dangerous materials over long distances; and (3) it produces nitrites in the end product in concentrations that are harmful when applied to crops.

Thirdly, the process of U.S. Pat. Nos. 2,028,178 and 2,088,869 is inefficient because: (1) it has large fertilizer losses in transit; (2) it provides a low yield of usable nitrate ions; (3) it converts oxides to nitrates in (a) conventional trickle towers which are large if operated at atmospheric pressure or expensive if operated at conventional high pressure; (b) turbine infall or outfall which results in prohibitive nitrogeneous raw material losses in the form of nitrogen oxides gas loss to the atmosphere; or (c) irrigation ditches which results in high levels of nitrite ions and the high loss of nitrogenous gasses to the atmosphere; and (4) it has a low yield of usable nitrogen fertilizer compounds from the initial manufacturing process because the means taught for rationing of ammonia to nitric nitrogen in consonance with the relative alkalinity or acidity of water or soil is by controlling the proportion of ammonia which is oxidized.

In the last case, the effluent gases from the oxidizing catalyst comprise the desired mixture of ammonia-nitric-oxide-oxygen-inert gases which gas mixture is then cooled and passed into a trickle tower or otherwise brought into contact with the water or a portion of the water to be utilized for irrigation.

This process has the disadvantage of resulting in a large proportion of the ammonia and nitric oxide produced by the process being converted to inert nitrogen gas and water, thus making the process yield so low as to be impractical. The approach was apparently selected because it would interface conveniently with the inherent characteristics of a hydroelectric-irrigation project.

Because the decomposition of ammonium nitrite is an ionic reaction in which the ammonium ion combines with the nitrite ion to form gaseous nitrogen as a product, scrubbers or sources of turbulence designed to remove nitrogen oxides from gas streams or to form ammonium nitrate and ammonium nitrite using ammoniated liquids suffer substantial raw material loses by decompositions of ammonium nitrite in this manner, especially at higher oxide concentrations because they generally operated at too low pH's.

The multi-purpose irrigation-hydroelectric projects are necessarily large-scale (U.S. Bureau of Reclamation, Reclamation Project Data; historical, technical and statistical information on reclamation projects; U.S. Government Printing Office 1948) with each project serving as a minimum approximately 20,000 acres and generally substantially more than 50,000 acres of farmland. They are restricted as to general usefulness because they must use large-scale, multi-purpose dam sites for water and power, thereby requiring the consideration of a large number of individual farmer's separate needs in the fertilizer management thus making the project unmanageable.

Such projects are useful only for large-scale applications and therefore do not permit practical tailoring of the ions produced to specific crop needs unless the same crop is used by many farmers over a wide area in the irrigation district. However, this results in agronomic difficulties with diseases and insects.

Such projects have the disadvantages of: (1) requiring the handling and conversion of nitrogen oxides at a central irrigation-hydroelectric dam site as contrasted to processing in a small locality or on a farm where the control is necessary to agronomic and economic success; (2) causing extensive ground water pollution by requiring the transport of nitrogen fertilizer to farms in district irrigation canals; (3) requiring the transportation of corrosive and environmentally dangerous materials over long distances to farms in open ditches; (4) causing losses of nitrogen fertilizer in delivery to the farm that are economically prohibitive; and (5) having a yield of usable nitrate ions that is low.

This system produces nitrites in the end product in concentrations that would be harmful when applied to crops unless conventional trickle towers, which to be efficient are large in size if operated at atmospheric pressure and require expensive construction and maintenance if operated at conventional high pressure, are used for oxidation to nitrate. Trickle towers normally have 30 to 35 stages for operation at atmospheric pressure. The use of turbine infall or outfall for oxidation conversion results in prohibitive nitrogeneous raw material losses in the form of nitrogen oxide gas loss to the atmosphere.

Still other methods have been developed or proposed for manufacturing and providing non-pressure nitrogen fertilizer solutions for a farm, which purport to improve the current commercial system for converting nitrogen oxides to usable nitrate ions.

One such method, described in U.S. Pat. No. 2,102,136, proposes passing nitrogen oxides into a flow of acidified inorganic nitrate, preferably a nitrate of ammonia solution, to which is continually added ammonia. The fluid is recycled through a tower until it is increased in bulk to the desired point and then periodically drawn off. After neutralization, it is sent to storage as an ammonium nitrate solution. The solution produced is then used in the normal commercial manner. This process requires either a large number of stages or high pressure operation so it does not provide economic or logistical advantages over the existing commercial system.

Another prior art process disclosed in U.S. Pat. No. 1,541,808 teaches the direct formation of an ammonium nitrate solution for subsequent utilization in the normal commercial manner. It proposes the use of an ammonium bicarbonate or carbonate solution as an absorbing medium for nitrogen oxides, for the purpose of forming an ammonium nitrate-nitrite solution which solution is treated with nitric acid and air in an ammonium nitrite oxidation tower to convert the nitrite to nitrate.

A main disadvantage of this process is the loss of nitrogen oxide raw material during the absorption of the last 30% of the nitrogen oxides. The patent recommends that for some purposes it is advisable to make some other use of these oxides. The process also has the disadvantages of requiring: (1) the use, and thus making, of carbonate or bicarbonate solution as an absorbing liquid; and (2) requiring the use of substitute oxide recovery methods at low nitrogen oxide feed gas concentrations.

In the early designs for atmospheric-pressure nitric acid plants, alkali absorption of various amounts of the oxides of nitrogen was carried out to reduce the size of the plants. It was common to absorb the last 20 to 30% of the oxides from a nitric acid process in a base other than ammoniated solutions. Ammonia was not used because of the loss of gases as nitrogen by decomposition of ammonium nitrite, which is an ionic process forming nitrogen and water. The process of U.S. Pat. No. 1,541,808 has the same problems.

Still other patents describe processes for making ammonium nitrate which rely upon the removal of nitrogen oxides from the effluent gases of industrial process plants and particularly nitric acid plants for the main purpose of preventing nitrogen oxide pollution of the atmosphere, while at the same time deriving a useful nitrogenous end product from the nitrogen oxides removal process. These processes teach: (1) the use of absorbing solutions of acidic and ammonical ammonium nitrate, which solutions are employed in various manners; and (2) the use of nitric acid as an oxidant for converting ammonium nitrite formed in the processes to useful ammonium nitrate. Examples of those processes are described in U.S. Pat. Nos. 3,453,071; 4,151,265 and 4,219,534.

U.S. Pat. No. 3,453,071 has the disadvantages of: (1) requiring that the molar ratio of NO to $NO_2$ be approximately 1:1 prior to passing the feed gases into the ammoniacal ammonium nitrate absorbing solution in order for the process to work; and (2) requiring multiple ammoniated absorption stages. During the normal operation of a nitric acid plant, the ratio of NO to $NO_2$ in the tail gas varies considerably with ambient operating condition variations, it is very difficult to control the oxide ratios at 1:1 under practical operating conditions and the ratios would likely vary considerably between the suggested multiple stages of the suggested process thus complicating the practice of the process commercially. Moreover, this process has low nitrogen oxide recovery and marginal performance in the removal of nitrogen oxides from the gas stream.

The process of U.S. Pat. Nos. 4,151,265 and 4,129,534 applies to the removal of nitrogen oxide gases from the tail gas of a nitric acid plant which gas typically contains from 2,000 to 6,000 ppm of nitrogen oxides. In the process, incoming tail gas is reacted first with acidic ammonium nitrate, the exit gas from the first stage is reacted with ammonical ammonium nitrate liquid and exit gas of the second stage is contacted in a third stage with acidified water.

Under low pressure or low oxygen conditions, a nitrogen dioxide rich gas is added to the first stage to cause the exit gas of the first stage to have a nitrogen dioxide to nitric oxide ratio of about 2:1 thereby facilitating the effectiveness of the second stage. The reactant liquids of the system are circulated and proportioned in a manner which minimizes the formation of ammonium nitrite and oxidizes the ammonium nitrite which is formed to ammonium nitrate in an acidic ammonium nitrate liquid.

This process is effective for recovering nitrogen oxides from typical high pressure or medium pressure nitric acid plant tail gases while forming ammonium nitrate solution as an end product. The process is proposed for nitric acid plants operating at from three to seven atmospheres pressure and with typical nitrogen oxides content of the tail gases of about 2,000 to 6,000 rpm.

This process for making ammonium nitrate solution has the disadvantages of: (1) being applicable only to typical tail gas streams; (2) requiring extensive circulation and control of reaction liquids; (3) depending on high pressure operation conditions; (4) requiring the use of nitrogen oxide free gas to the first stage, which is rich in nitrogen dioxide content; (5) not conviently producing a speicified ratio of nitrate to ammonium ions in the end product; and (6) producing a low concentration nitrogen solution end product.

Firstly, this process is applicable only to typical tail gas streams which are low in content of nitrogen oxides. Thus it is limited in the amount of ammonium nitrate that can be produced while handling a given volume of gases. Because of this, it is limited in production capacity and economic return on plant investment unless used primarily for pollution control.

Secondly, it requires extensive circulation and control of reaction liquids. To provide this circulation and control, sophisticated controls and pumps must be used thus causing excessive cost.

Thirdly, it requires high pressure operation conditions in the preferred embodiment for conversion of nitrogen oxides to usable nitrate ions. This requirement causes the absorber size and construction to be similar to that for a normal commercial nitric acid process.

Fourthly, it requires the use of nitrogen oxide feed gas to the first stage, which is rich in nitrogen dioxide content, when operating under low pressure or low oxygen conditions. This complicates the use of the process for low pressure operating conditions.

Fifthly, it does not conveniently produce a specified ratio of nitrate to ammonium ions in the end product at a local or farm use site. Thus, it is not useful as an economic and convenient source of nitrogen solution fertilizer containing the desired ratio of nitrogen ions at the locality or farm for a particular cropping use.

Sixthly, it produces a low concentration nitrogen soltion end product which must be transported at high cost over long distances to a farm market if it is to be used as nitrogen solution fertilizer.

SUMMARY OF THE INVENTION

Accordingly, it is an object of the invention to provide a novel method for nitrogenous fertilization of crops.

It is a further object of the invention to provide a novel apparatus for nitrogenous fertilization of crops.

It is a still further object of the invention to provide an inexpensive method and apparatus for supplying substantial amounts of nitrogen fertilizer to crops.

It is a still further object of the invention to provide an inexpensive method and apparatus for manufacturing on the farm or in the locality of farms substantial amounts of nitrogen fertilizer solutions in a form and concentration practical for farm storage and use.

It is a still further object of the invention to provide a novel fertilizing technique in which the fertilizers are primarily manufactured on the farm where used.

It is a still further object of the invention to provide an inexpensive method and apparatus in which the conversion of the oxides of nitrogen to nitrate for use in a nitrogen fertilizer solution is facilitated by using appropriate chemical reaction systems as a primary conversion vehicle at low or negative pressure rather than facilitating the conversion of the oxides to nitrate through the use of conventional high pressure.

It is a still further object of the invention to provide a nitrogen fertilizer manufacturing apparatus which may be of a scale which produces nitrogen fertilizer solution in accordance with an individual farmer's needs.

It is a still further object of the invention to provide a nitrogen fertilizer apparatus that can be easily started and stopped so as to be practical for operation on individual farms or in the vicinity of one or more farms for use on those farms.

It is a still further object of the invention to provide a farmer with a nitrogen solution fertilizer manufacturing process and apparatus of a scale and capability that permits him to exercise nitrogen fertilizer management control at the farm site for maximum efficiency in the use of nitrogen fertilizer.

It is a still further object of the invention to provide a nitrogen solution manufacturing process and apparatus located on a farm or in the vicinity of one or more farms for making nitrogen solution for use on those farms which is sufficiently simple, flexible, efficient and economic in starting operating, turning down and stopping that it can be adapted readily to individual management.

It is a still further object of the invention to provide a nitrogen solution manufacturing process and apparatus located on a farm or in the vicinity of one or more farms for making nitrogen solutions for use on those farms which is sufficiently simple, flexible, efficient and economic in starting, operating, turning down and stopping that it can be adapted readily to use renewable resources as raw material and energy inputs for operation.

It is a still further object of the invention to provide a novel and unique system for solubilizing and mixing non-nitrogenous fertilizer materials with the apropriate low-scale manufactured nitrogen solutions manufactured at the site thereby avoiding the expense of commercial solubilizing, mixing and low concentration transportation of such finished fluid fertilizers.

It is a still further object of the invention to provide a safer method for preparing nitrogen fertilizer.

It is a still further object of the invention to provide a novel fertilizing system in which the synthesis of the fertilizer and the application of the fertilizer are done in continuous processes using dilute amounts of materials.

It is a still further object of the invention to provide a fertilizing system which does not require the storage of toxic, corrosive or explosive gases or materials in substantial amounts for long periods of time.

It is a still further object of the invention to provide a system for manufacturing and using nitrogen fertilizers in solution to avoid storage of toxic or explosive gases.

It is a still further object of the invention to provide a manufacturing and fertilizing system for crops where the ratio of ammonium to nitrate ions supplied to and in the soil solution can be controlled and thereby enhance crop yields.

It is a still further object of the invention to provide a method of manufacturing nitric acid and ammonium nitrate solutions in practical concentrations to reduce nitrogen oxide pollution of the atmosphere without additional expense in the manufacturing process.

It is a still further object of the invention to provide a method and apparatus for igniting an ammonia oxidation reaction process without preheating the gases.

It is a still further object of the invention to enhance a process for preparing nitrogenous fertilizer solutions using apparatus operating at low or slight negative pressures instead of high pressures.

It is a still further object of the invention to provide a novel multi-stage system in which substantially all the nitrogen oxides created from the burning of ammonia are converted to useful nitrogen products for fertilizer in relatively few stages which differ from each other in chemical reactions.

It is a still further object of the invention to provide a converter for the formation of fertilizer nitrates which operates at a pressure sufficiently low so that ammonia oxidation catalysts and particularly a cobalt catalyst can be used in a manner to give the most efficient yields.

In accordance with the above and further objects of the invention, nitrogen oxides are obtained by the burning of ammonia using a catalyst. The ammonia-air mixture is ignited without preheating the gases by means of a small arc such as that provided by a gas heater igniter. The principal nitrogen oxide obtained is nitric oxide.

The nitric oxide from the burner is cooled, mixed with oxidation air and transferred along with the required amount of air to an oxidation chamber through an oxidation volume sufficiently large to permit a large portion of the nitric oxide formed by the burning of the ammonia to be oxidized to nitrogen dioxide. This reaction is not under positive pressure and only requires one stage.

The gas exiting the nitric oxide oxidation chamber (oxidizer) is transferred to a first absorbance stage where it is contacted with water to form nitric acid through a combination of reactions which are normally accepted in the art as being summarized by nitrogen dioxide gas combines with water to form nitric acid and nitric oxide.

The nitric acid solution formed from the nitrogen dioxide and water is collected at the bottom of the first absorbance stage and transferred continuously to its stripper-oxidizer section. The gases not absorbed in the water-gas contacting zone of the first absorbance stage and the nitrogen oxides produced in the water-gas contact zone are passed to a second stage. The nitrogen oxides in that zone are primarily nitric oxide.

The second absorbance stage is advantageously a packed column. For use in the second absorbance stage, water is mixed with ammonia to form ammoniated liquid feed for the second stage. The ammoniated liquid feed is distributed to maintain the pH of the second stage liquid between 6.7 and 8.5 while thoroughly wetting the packing of the second stage.

The packing geometry, packing volume, packing surface area, free space, liquid flow rate, liquid charactertistics, gas velocity and gas characteristics are arranged to provide rapid and efficient nitrogen oxide removal from the gas stream, facilitated primarily by maintaining a steady-state non-equilibrium thermodynamic chemical state in the system rather than by using high pressure and multiple stages to facilitate reaching a chemical equilibrium as in the prior art processes. This stage removes nitrogen oxides from the gas phase as a water solution of an intermediate compound in the nitrate fertilizer formation process and reduces the tendency to develop a slowed rate of reaction near equilibrium in the gas phase. This enables the chain of reactions leading eventually to nitrate formation to continue at a rapid rate until substantially all of the oxides are converted.

In the second stage, the ammoniated feed liquid flows downwardly irrigating the packed gas-liquid contact zone of the second stage while the exit gases from the first stage are moved upwardly through the second stage packing for reaction and absorption with and in the liquid feed. The gas flow is countercurrent to the liquid flow in the preferred embodiment but operation may also be carried out in a cocurrent flow mode.

The packing geometry, packing volume, free space, liquid flow rate and gas velocity of the second stage are arranged and combined to facilitate the formation of dinitrogen trioxide in the gas phase of the second stage and further to immediately contact the dinitrogen trioxide formed with the wetted surfaces of the packing of the second stage causing the rapid formation of nitrous acid and ammonium nitrite in the liquid and vapor phase. Additionally, nitrogen dioxide formed in the second stage and not consumed in the formation of dinitrogen trioxide forms nitric acid and then ammonium nitrate when it is contacted with the liquid and vapor of the second stage.

In this embodiment, nitrogen oxides entering the second stage from the first stage are principally in the form of nitric oxide rather than being reoxidized substantially to nitrogen dioxide. This system is capable of using a feed gas which is principally nitric oxide and does not require extensive chemical manipulations. By maintaining a preponderance of nitric oxide in the nitrogen oxides entering the second stage, a proper packed column geometry, adequate material flux and a high pH (in the second stage) through ammoniation, the formation of dinitrogen trioxide and thus the formation of ammonium nitrite from ammonium hydroxide and dinitrogen trioxide is facilitated in the second stage.

Although the oxidation of nitric oxide to nitrogen dioxide is normally characterized as a slow reaction in the normal nitric acid process where it is carried substantially to completion under high pressure, it is relatively rapid in the second stage absorption process of this system, where the molar ratio of nitric oxide to nitrogen dioxide is large. In the second stage gas phase, as nitrogen dioxide is formed, it is used in the formation of dinitrogen trioxide, which is a very rapid reaction.

As dinitrogen trioxide is formed in the packing free space, it is in close proximity to the wetted packing surface. This facilitates contact with the wetted surface as the gases are moved through the packing and the dinitrogen trioxide is rapidly removed from the gas phase through the formation of ammonium nitrite by interacting with ammonium hydroxide, which is also a rapid reaction. Thus, nitrogen oxides are quickly and easily removed from the gas phase. The ratio of nitric oxide to nitrogen dioxide therefore remains favorable for formation of nitrogen dioxide and dinitrogen trioxide and thus high pressure is unnecessary.

By maintaining the pH of the second stage liquid above pH 6.7 and preferably at about 8.4, and thus minimizing ion formation, the potential for decomposition of ammonium nitrite into gaseous nitrogen and water, which is ionic in nature, is essentially eliminated. Thus, the packing geometry, packing volume, free space, liquid flow rate and gas velocity of the second stage are arranged and combined to facilitate the formation of dinitrogen trioxide in the gas phase of the second stage, and further to immediately contact the dinitrogen trioxide formed with the vapor and wetted packing surfaces of the second stage, causing the rapid and continuous formation of ammonium nitrite in the liquid and vapor phases.

Some ammonium nitrate is found in the liquid of the second stage as well as ammonium nitrite so it seems probable to an appreciable extent in the second stage that some combination of reactions occur in which: (1) nitrogen dioxide gas and water react to form nitric acid and nitrogen monoxide; (2) nitrogen dioxide gas and water react to form nitric acid and nitrous acid; (3) ammonium nitrite and ammonium nitrate are formed from nitrogen dioxide and ammonium hydroxide; and (4) nitrate is formed from ammonium nitrite and oxygen.

However, the occurrence of this chain of reactions is minor as contrasted to the extent to which another chain of reactions occurs, in which: (1) nitrogen monoxide forms nitrogen dioxide by oxidation; (2) dinitrogen trioxide is formed from nitric oxide and nitrogen dioxide; and (3) ammonium nitrite is formed from ammonium hydroxide and dinitrogen trioxide. Consequently, the liquid effluent from the second absorbance stage is an ammoniacal ammonium nitrite-nitrate solution.

It has been found that the lineal velocity of gas flow through the second stage packing is most effective at lower rates than for standard packed column design such as rates 12 times slower and, likewise, extremely low liquid flow rates per unit of packing cross section such as 17 times less are found to be more effective than results obtained with standard packed column recommendations as recommended in chapters 14 and 18 of Chemical Engineering Handbook, fifth edition, published by McGraw Hill, N.Y., N.Y. (1973). This slower rate in the second stage is proportional to chemical reactions described above rather than simple mass transfer relationships relied upon in most packed columns for absorption.

The ammonium nitrite-nitrate liquid from the second absorbance stage is collected and applied with rapid mixing to the stripper-oxidizer of the first absorbance stage concomittantly with nitric acid formed in the first stage and heated air, resulting in the formation of: (1) an acidic ammonium nitrate solution end product for application to farm lands, storage or further treatment; and (2) gases exiting the stripper-oxidizer containing nitrogen oxides, principally in the form of nitrogen dioxide.

These conversions are presumably accomplished principally as the result of forming ammonium nitrate and nitrogen dioxide from ammonium nitrite and nitric acid and from ammonium nitrite and oxygen. The exit gases containing nitrogen dioxide are transferred to the nitric acid forming section of the first stage and effectively recovered as nitric acid and nitric oxide by nitrogen dioxide gas and water reacting to form nitric acid and nitric oxide.

In one embodiment, process water is transferred through the system by a water supply pump and in a second embodiment, by irrigation water pump bypass. In the one embodiment, the liquid fertilizer formed is transferred to a storage or processing system for later use and in the second embodiment it is transferred by a pump directly to an irrigation system for application to the crop. In the embodiment where fertilizer is made for storage and later use, concentrations are increased and provisions are made to either use the heat formed at the local site or to dissipate it.

Gases are drawn through the system by a blower located at a final filter stage, causing the system to operate at a slight negative pressure. Low or negative pressure which this system is able to use enhances the conversion efficiency of all known ammonia oxidation catalysts and particularly enhances the efficiency of the cobalt oxide catalyst. Further, a slightly negative pressure in the second stage absorber has been found to speed up and increase the yield of the reaction system for forming ammonium nitrite and to minimize the nitrite content of the final product exiting from the stripper-oxidizer section of the system. Moreover, operation under a slightly negative pressure is a significant safety factor against noxious gas leaks.

Solid ammonium nitrite and ammonium nitrate particles formed in the second stage and entrained in the exit gases of the second stage are trapped and solubilized at a final submicron particulate filter and the resulting liquid is comingled with the liquid flow from the second stage. This scrubbing is accomplished with any suitable type of filter apparatus, one of which is sold under the trademark, B-Gon filter pad by Kimre, Inc. of Perrine, Fla.

Absorption and conversion of nitrogen oxides to liquid nitrogen fertilizer in this system are aided by an apparatus and process which establishes steady-state physical and chemical non-equilibrium. The rate of conversion is increased by the formation of intermediate compounds and the removal of the compounds at relative rates that prevent an excessive slowing of the desired reaction caused by accumulation of the intermediates. Thus, the formation of nitrogen dioxide from oxidation of nitric oxide and formation of dinitrogen trioxide from nitric oxide and nitrogen dioxide is facilitated by removal of dinitrogen trioxide to shift equilibrium toward formation of dinitrogen trioxide in the gas phase. The removal of dinitrogen trioxide by reaction with ammonium hydroxide to form ammonium nitrite in the liquid phase removes the dinitrogen trioxide by converting it to a flowing liquid solution of ammonium nitrite.

This balance is achieved by proper selection of interfacial area, viscosity of the liquids, surface tension, free space, pressure level, reaction rates, temperature, pH and reactant concentrations. These relationships apply to both the gas and liquid phases. Principally, surface contact area, free space, temperature, pH, reactant concentrations and flow rates are the most easily controlled variables.

The process and apparatus of this invention do not use the standard commerical practice of first making nitric acid at an equilibrium concentration in which the nitric acid vapor pressure is balanced in the absorber system and then collecting or destroying the remaining vapor and gas phase oxides which cannot be absorbed as nitric acid to prevent pollution. Instead, it uses a chemical process in which the rate at which a reaction or series of reactions moves toward equilibrium and the reaction rate is maintained high by removing an end or intermediate product. The establishment of non-equilibrium as a steady-state condition furnishes the driving cause in this process. The molar ratios of the oxides which are maintained in the system are by design selected for this non-equilibrium steady-state condition and facilitate the rapid absorption of the nitrogen oxides.

The reactions which result in the formation of: (1) dinitrogen trioxide from nitric oxide and nitrogen dioxide; (2) nitrous acid from dinitrogen trioxide and water; (3) ammonium nitrite from dinitrogen trioxide and ammonium hydroxide; and (4) ammonium nitrite and ammonium nitrate from nitrogen dioxide and ammonium hydroxide, which is analogous to the reaction which results in the formation of nitrous acid from dinitrogen trioxide and water, are reactions which prior art systems strive to preclude but aid nitrates to be efficiently formed when used in accordance with the process of this invention.

They are extremely rapid reactions and are effectively used in the design of the second stage absorber apparatus and process. The first and second stages are balanced in the amount of nitrogenous fertilizer formed from nitrogen oxides by economic considerations to make: (1) nitric acid economically from available quantities of nitrogen dioxide; and (2) other nitrogenous liquids that can be formed from other nitrogen oxides faster or at lower cost with the remainder of the nitrogen oxides.

The liquid product from the second stage is treated in the stripper-oxidizer of the first stage to oxidize the intermediate compounds to the desired nitrate products. Ammonium nitrate and nitrogen dioxide gas are formed from ammonium nitrite and nitric acid and ammonium nitrate is formed from ammonium nitrite and oxygen. The overall system uses steady-state physical and chemical non-equilibrium thermodynamic principles to aid in the absorption and conversion of nitrogen oxides to a non-pressure nitrogen fertilizer solution.

The non-equilibrium process is effective in the preferred embodiment because: (1) the nitric oxide to nitrogen dioxide oxidizing reaction and the nitrogen dioxide gas and water reaction to form nitric acid and nitric oxide are both fast under process conditions; and (2) the formation of dinitrogen trioxide from nitric oxide and nitrogen dioxide is fast. The preferred embodiment removes the various nitrogen oxides from the system in a liquid phase immediately as they are formed, thus establishing a driving cause for their efficient absorption and conversion to ammonium nitrite which is subsequently converted to ammonium nitrate.

From the above description, it can be understood that the process of this invention has several advantages such as: (1) it is economical and safe; (2) the use of commercial ammonia can be spread over a crop season instead of requiring use at a peak period and yet the benefits of using nitrogen solution with low raw material costs are realized; (3) it requires the local plant or farmer only to buy the relatively inexpensive ammonia form of nitrogen; (4) it does not require storage of large quantities of fertilizer locally or on the farm prior to use; (5) the fertilizers can be manufactured and supplied in sufficient quantities when needed; and (6) nitrogen oxide pollution is eliminated.

It is economical and safe because it does not require: (1) the storage or handling of large amounts of ammonia, nitric acid, nitrogen, hydrogen or the like; (2) high pressure apparatus; (3) storage of the fertilizer solution itself by a manufacturer prior to shipment to a number of different dealers and farms; or (4) long-distance transportation of finished fertilizer to dealers and to farms. Moreover, safety and cost are improved because: (1) heat from the exothermic reactions is easily and safely used or dissipated because of its small process size and continuity; (2) the synthesis of concentrated nitric acid is not necessary; (3) the system operates at a slightly negative pressure or atmospheric pressure; and (4) high yields of useful nitrogen compounds are obtained.

It does not require high pressure because gas absorption is facilitated by use of non-equilibrium chemistry rather than the high pressure normally used to achieve equilibrium chemistry. Moreover, the synthesis of concentrated nitric acid is not necessary and nitrogen oxide formation and absorption can be carried out at atmospheric pressure or slightly negative pressure with superior raw material recovery and thus at a cost saving over normal commercial processes. Nitrogen oxide pollution is eliminated because absorption is carried out substantially as a part of the process.

SUMMARY OF THE DRAWINGS

The invention and other features thereof will be better understood from the following detailed description when considered with reference to the accompanying drawings in which:

FIG. 6 is a side elevational view of a portion of the system of FIG. 1;

FIG. 7 is a sectional view of the portion of FIG. 6; and

FIG. 8 is an enlarged fragmentary view, partly-sectioned of a portion of the system of FIG. 7.

DETAILED DESCRIPTION

Figure 1:
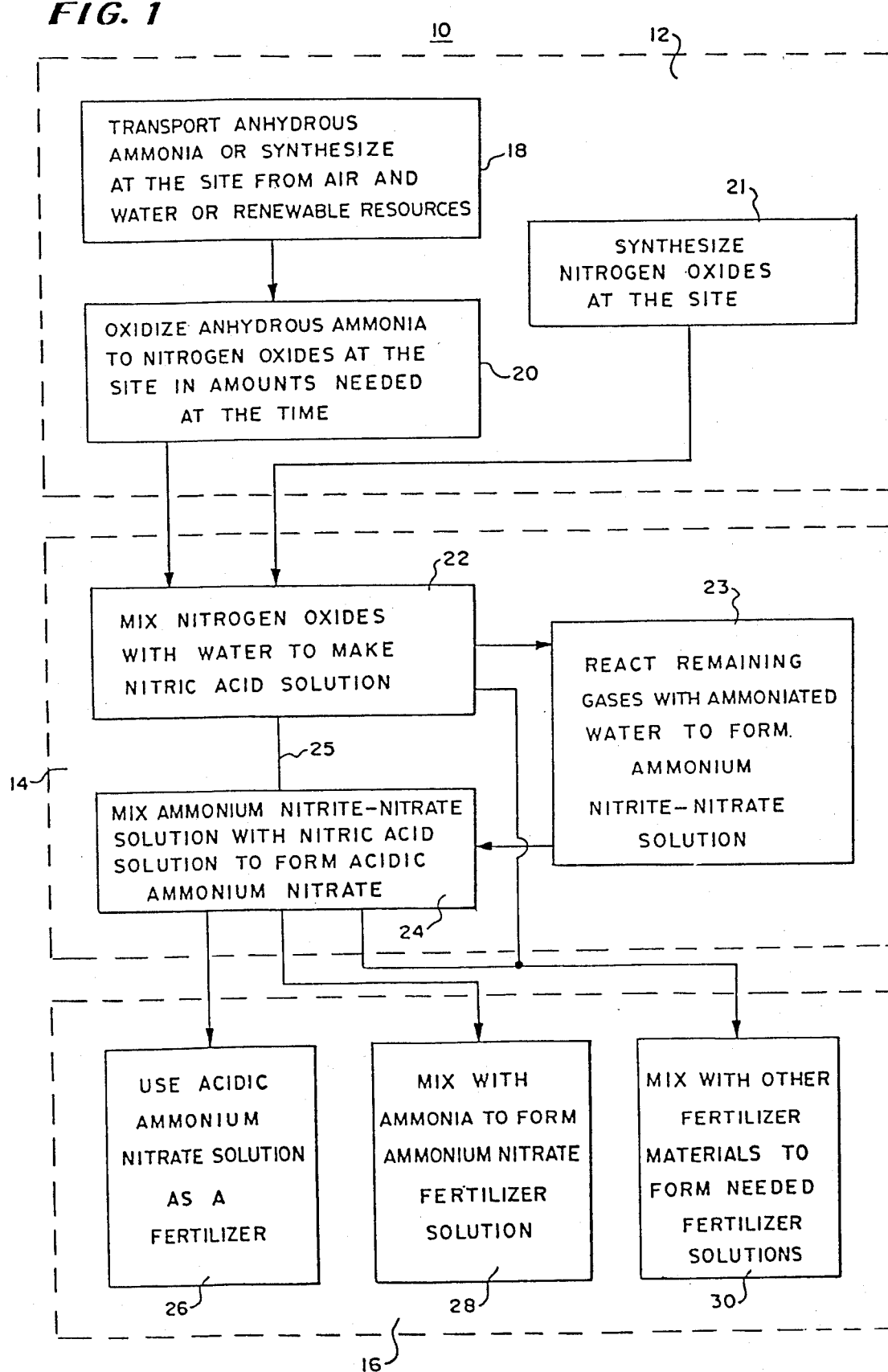
FIG. 1 is a flow diagram of a system for preparing and using nitrogenous fertilizer in accordance with the invention.

In FIG. 1, there is shown a flow diagram of a novel process 10 for nitrogenous fertilizing of agricultural land having as its principal subprocesses a process 12 for obtaining ammonia and nitrogen oxides on a local site, a process 14 for converting the nitrogen oxides into nitrogen compounds susceptible of utilization by vegetation and several alternate steps 16 for utilizing the nitrogen compounds formed in the process 14. These nitrogen compounds are principally ammonium and nitrate ions and, in the preferred embodiment, principally ammonium nitrate.

In this case, local site means within a distance of use suitable economically for transporting dilute solutions. Usually, this is directly on the farm where used or a fertilizer dealer within 50 miles of the farm. A dilute solution means at least sixty percent of the solution is water.

In the preferred embodiment, the subprocess 12 for forming nitrogen oxides includes either: (1) a process 21 for synthesizing the nitrogen oxides at the local site from air and water or renewable resources; or (2) a process for forming the nitrogen oxides from ammonia. The formation of nitrogen oxides from ammonia includes the step 18 of transporting anhydrous ammonia to the local site or in the alternative, of synthesizing ammonia at the site from air and water or renewable resources followed by the step 20 of forming nitrogen oxides by oxidizing the ammonia at the site into nitrogen oxides. In one embodiment, it is prepared at the time it is to be used as a feedstock for manufacturing and applying fertilizer to the field.

The anhydrous ammonia may be transported to the local site or farm field as needed. It is relatively high in concentration of nitrogen per unit of weight and volume as compared to the non-pressure nitrogen fertilizer solutions that conventionally are shipped to a farm for nitrogen fertilization on the farm. Thus, there is a cost savings in: (1) cost and storage space in shipping anhydrous ammonia over shipping non-pressure nitrogen solutions; and (2) raw material recovery and use.

In the preferred embodiment, nitrogen oxides are formed from anhydrous ammonia in the step 20 in the subprocess of obtaining nitrogen oxides 12. This is accomplished by oxidizing the anhydrous ammonia to nitrogen oxides at the site in a continuous process in amounts needed at that time for forming the fertilizer. The oxidation takes place at atmospheric pressure or slightly less than atmospheric pressure and substantially concomitantly with downstream fertilizer solution formation and concurrent application to the farmland or storage at the site. Consequently, it is not necessary to handle the nitrogen oxides under pressure or to store the nitrogen solutions in large quantities.

In addition to the cost benefits from reduced cost of transportation, better raw material recovery and low pressure operation, this process synergistically permits a relatively inexpensive catalyst, cobalt oxide, to be used because the oxidation of the ammonia is small scale and at low pressure. In the large scale prior art commercial processes which operate under high pressure, the ammonia is generally oxidized using a platinum alloy catalyst. A cobalt catalyst charge of the necessary size is approximately 10% of the cost of the platinum alloy catalyst needed.

Cobalt oxide is generally not used as a catalyst in prior art systems because such systems operate at high pressures in which ranges the cobalt oxide is not the best material. Other ammonia oxidation catalysts operate at a higher conversion efficiency at low pressure than at high pressure but it has been found that the cobalt oxide catalysts are particularly more efficient and cost effective at low pressure.

Because the preferred embodiment allows absorption of the nitrogen oxides through chemical manipulation in a small absorber volume at low pressure, the cobalt catalyst can be used at high efficiency. Thus, the use of a smaller low-pressure, less-expensive absorption apparatus on a per unit of nitrogen basis rather than a more-expensive, high-pressure prior art system has the added advantage of using a much less expensive catalyst.

The nitrogen oxides formed in the subprocess 12 are utilized in the subprocess 14 to prepare ammonium nitrate solution which continually flows and, as shown in subprocess 16, is either used as fertilizer itself or formed into other mixed fertilizers and used in continuously flowing irrigation water or transferred to storage. As shown generally at 14, the ammonium nitrate solution is prepared by combining the nitrogen oxides with water and with ammonia in appropriate liquid gas contacting systems. At no time is it necessary to handle concentrated nitric acid or to store large amounts of nitric acid in this process.

To form the nitrate solutions in the subprocess 14, the nitrogen oxides from the subprocess 12 are mixed with water in the step 22 to make nitric acid solution from some of the oxides, the remainder of the gases flowing to a second step 23.

In the second step 23, water and ammonia are mixed to form an ammoniated reaction liquid. The remaining gases are contacted and reacted with this solution to form a mixture of ammonium nitrite and ammonium nitrate. The ammonium nitrite-nitrate is then mixed and treated at a third step 24 with the nitric acid solution formed at step 22, resulting in a high yield of ammonium nitrate. The nitric acid solution and ammonium nitrite-nitrate solution are mixed in the presence of heated bleach air. Gases created during oxidation of the ammonium nitrite are returned to the water of step 22 to form nitric acid solution.

The nitric acid formed in step 22 is in a solution that contains nitrogen oxide gases formed as part of the reaction with water and other gases. These gases are removed by forcing air through the solution, which air both removes the gases and oxidizes some of them further. This process is called "stripping" and the place where it occurs is referred to as a "stripper".

The excess stripper-oxidizer air and the nitrogen oxides formed and stripped out of the stripper-oxidizer liquid are cycled to the gas-water contact zone of step 22 for recovery as shown by line 25 in FIG. 1. Liquid output of step 24 may be treated in subprocess 16 to control the ratio of ammonium ions to nitrate ions for specific crop and fertilizer management needs.

To adjust the ratio of nitrate to ammonium ions, additional ammonia is added until it is adjusted to the desired point. The amount of ammonium nitrate can be determined by measuring solution density and a ratio favoring nitrate ions formed by decreasing the ammonia to establish the desired ratio or a ratio favoring ammonium ions can be formed by increasing the ammonia to the desired ration. The fertilizer solution containing a preponderance of nitrate may be used directly on a desired crop or the acidic solution can be mixed with and used to solubilize or suspend other fertilizer materials such as non-nitrogeneous cations, rock phosphate or other materials.

The ammonium nitrate solutions, nitric acid or mixtures of nitric acid and ammonium nitrate may be used in any of the steps of the subprocess 16 such as the three steps indicated at 26, 28 or 30.

Firstly, as shown at 26, the solutions as an acidic mixture of dilute nitric acid and ammonium nitrate may be applied directly to the farmland as a top dressing at certain stages of growth of certain crops with beneficial effects. This procedure is best used for those crops which require a preponderance of nitrate ions for maximum growth.

Secondly, as shown at 28, the acidic solution of nitric acid and ammonium nitrate may be mixed with further ammonia to form a solution containing only ammonium nitrate which may be applied to the farmland. This step is preferred for crops which utilize ammonium and nitrate ions equally or non-preferentially since it requires sending only one half of the ammonium nitrogen through the oxidizer.

Thirdly, as shown at 30, a cation such as potassium may be mixed with the acid solution of nitric acid and/or ammonium nitrate to form fertilizers which are especially useful for certain crops because of the addition of the other cation and the preponderance of the nitrate form of nitrogen in the solution. Other desired fertilizer materials may be used instead. The solution of steps 22 and 24 may also be used to treat rock phosphate to make, for example, a nitric phosphate slurry or the solution of step 24 may be used to solubilize and carry trace elements of particular importance such as zinc.

Figure 2:
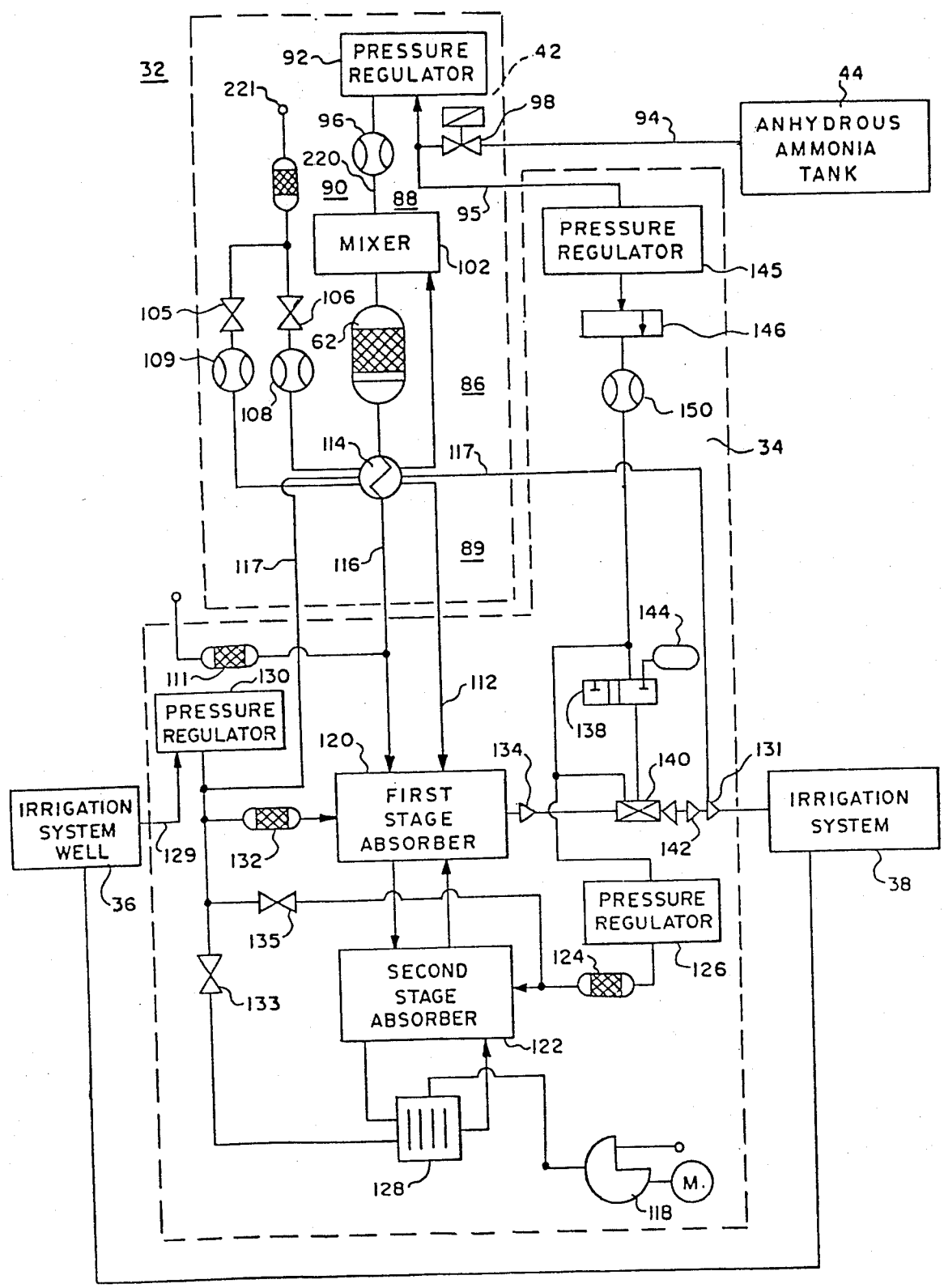
FIG. 2 is a schematic drawing of a portion of the system of FIG. 1.

In FIG. 2, there is shown a system of nitrogeneous fertilization 32 having a system 34 for preparing nitrogen fertilizer, an irrigation system well 36, an irrigation system 38, a system 42 for preparing nitrogen oxides and a source of anhydrous ammonia 44 such as an ammonia tank.

To provide feedstock and water to the system for fertilization 32: (1) the outlet of the source of anhydrous ammonia 44 is connected to the system for providing nitrogen oxides 42 and to the system for preparing nitrogeneous fertilizer 34; and (2) the irrigation system well 36 and irrigation system 38 are connected to the system 34 for preparing nitrogeneous fertilizer.

To provide water and nitrogeneous fertilizer, the output of the system for preparing nitrogeneous fertilizer 34 is connected to the irrigation system 38 to apply the nitrogeneous fertilizer through the irrigation system to the crop. The system 42 for preparing nitrogen oxides is connected to the system 34 for preparing nitrogeneous fertilizer to apply nitrogen oxides as a feedstock thereto.

To prepare nitrogen oxides from ammonia which it receives through the conduit 94, the system 42 includes: (1) a reactor system 86; (2) a system 88 for supplying anhydrous ammonia to the reactor system 86; (3) an air inlet system 90 for filtering, regulating and supplying: (a) air to the reactor system 86; (b) bleach air to the reactor exit gases; and (c) air to a stripper-oxidizer section (not shown in FIG. 2) to be described in connection with FIGS. 4, 5 and 6; and (4) a system 89 for supplying nitrogen oxides to the system 34 from the reactor system 86 for preparing fertilizer from nitrogen oxides. The nitrogen oxides in the gases exiting the system 89 are principally nitrogen monoxide.

To apply controlled amounts of anhydrous ammonia to the reactor system 86, the system 88 for supplying anhydrous ammonia includes a two-stage pressure regulator 92 with an outlet orifice of predetermined size, a flow meter 96 and a solenoid valve 98. The pressure regulator 92 has its inlet port connected to the anhydrous ammonia tank 44 through the conduit 94 and the solenoid valve 98 and has its outlet connected to the reactor system 86 through the flow meter 96 in series in the order named. With this arrangement, controlled and measured amounts of anhydrous ammonia are applied to the input of the reactor system 86, which input includes a mixer 102.

To supply air to the reactor system 86, the air-inlet system 90 includes an air filter 104, an air inlet orifice 22, a butterfly valve 106 and a flow meter 108 connected in that order to the heat exchanger system 114 and then to an input of the mixer 102 to supply air thereto. The motive force for air flow is provided by a blower 118 in system 34, which draws air through both systems.

To supply heated air to a stripper-oxidizer (not shown in FIG. 2) of the system 34, the air-supplying system 90 includes an inlet-control orifice or butterfly valve 105 and a flow meter 109. The valve 105 is connected between the air-inlet filter 104 and the flow meter 109 and the flow meter 109 is connected to the system 89 for supplying nitrogen oxides to the system 34 through the heat exchanger system 114 with its inlet into the system 34, being through the stripper-oxidizer. Air for oxidation of the exit gases of the reactor 86 is supplied to and mixed in conduit 116 through the filter and valve assembly 111.

To form nitrogen oxides from anhydrous ammonia, the reactor system 86 includes the mixer 102, the air-preheat section of the heat exchanger system 114 and a reactor 62. The mixer 102 has one inlet port connected to the output of the flow meter 96 to receive ammonia and another inlet port connected to the outlet port of the preheat section of the heat exchanger system 114. The outlet of the mixer 102 is connected to the inlet of the reactor 62 to apply the heated mixture of ammonia and air thereto. The heat exchanger system 114 receives heat from the system 89 for supplying nitrogen oxides to the system 34 for nitrogenous fertilization.

The air path from the meter 109 through the heat exchanger system 114 is separate from the air path from the meter 108 through the same heat exchanger. The reactor 62 receives the preheated mixture of ammonia and air and burns it to form the nitrogen oxides. The burning is performed with the aid of a catalyst, which in the preferred embodiment is a cobalt oxide catalyst.

The cobalt oxide catalyst operates efficiently at low pressure and is very inexpensive compared to the normal commercial-system platinum alloy catalyst. It is approximately 10% the cost of platinum and, at low pressure, catalyzes the required oxidation in a superior manner. A suitable cobalt oxide catalyst is supplied by En-Ren Corporation, 256 McCullough Street, Cincinnati, Ohio.

The burning may be conveniently started by the spark gap type of arc such as that provided by a portable space-heater igniter even without preheating of the air applied to the mixer 102. As the ammonia begins burning and air is preheated, the efficiency of burning rapidly increases to the point at which maximum operating efficiency is reached. A suitable igniter is sold by Wheelers Farm Stores, Inc., for use in portable space heaters.

To apply the nitrogen oxides to the nitrogen-forming system 34, the heat exchanger system 114 of the system 89 for applying the nitrogen oxides communicates through a conduit 116 with the nitrogen forming system 34. The system 34 draws air and gases from the system 42 in a manner to be described hereinafter.

The heat-exchanger system 114 receives: (1) cooling water from the system 34 through the conduit 117, which water is drawn through heat exchanger system 114 and returned to the system 34; and (2) nitrogen oxides from the reactor 62 which it cools and supplies to the input of the conduit 116 while air drawn by the system 34 is preheated in the heat exchanger system 114 and then drawn through the mixer 102. The cooled nitrogen oxides and other gases from heat exchanger system 114 and other gases from the reactor 62 are applied through the conduit 116 to a nitrogen oxidation space in the system for nitrogenous fertilization 34.

To prepare dilute nitrogen fertilizer solutions, the system 34 includes as its principal parts, a first-stage absorber 120, a second-stage absorber 122, and a tank 144 containing a solution including other useful fertilizer ions such as potassium ions which may be used to react with the dilute nitric acid or the like to form further solutes for application to the crops, a source of filtered air 111 and a submicron particulate scrubber 128.

The first-stage absorber 120 receives the nitrogen oxides, air and water and cooperates with the second-stage absorber 122 to prepare a controlled solution of dilute nitric acid and ammonium nitrate for application to the irrigation system. Ions from the compounds in the tank 144 may also be added to this solution. The first-stage absorber 120 also includes the stripper-oxidizer section to be described hereinafter.

To supply air and nitrogen oxides to the gas-liquid contact zone of the first stage absorber 120, conduit 116 delivers nitrogen oxides from the reactor 62 and air from the inlet and filter 111 to the oxidation space of absorber 120 and they pass subsequently to the liquid contact zone. Heated air from conduit 112 is supplied to the stripper-oxidizer (not shown in FIG. 2) within the first stage absorber 120 and its exit gases are also applied to the liquid contact zone. The filtered air inlet 111 supplies oxidation air to absorber 120 through conduit 116 for nitrogen monoxide oxidation in the gas phase. These gases are applied in controlled amounts to the first stage absorber 120.

The first stage absorber 120 also communicates: (1) with the irrigation well 36 through conduit 129, the pressure regulator 130 and filter orifice 132 in the order named to receive water; and (2) with a liquid-level-controlled pump 134 which draws the acidic ammonium nitrate from it to coordinate liquid flow through the system. The suction caused by the removal of the nitric acid and ammonium nitrate solutions by the pump 134 prevents liquid pressure from neutralizing the gas suction caused by blower 118.

To increase yield, when desired, of usable ammonium nitrates obtained from the nitrogen oxides, the ammonium content is raised by neutralizing the liquid output of the stripper-oxidizer section of absorber 120. The liquid output of the stripper-oxidizer section communicates with the anhydrous ammonia tank 44 through the following elements in series, which are: (1) the outlet port of the anhydrous ammonia tank 44; (2) the conduit 94; (3) a solenoid valve 98; (4) conduit 95; (5) a two-stage pressure regulator 145 with an adjustable outlet valve 146; (6) a flow meter 150; (7) a valve 138 and (8) a mixer 140. The mixer 140 under some circumstances receives sufficient ammonia from the tank 44 to neutralize the nitric acid from the first stage absorber 120.

A second input to the absorber 122 is connected: (1) to the anhydrous ammonia tank 44 through a pressure regulator 126, filter 124, meter 150, valve 146, pressure regulator 145 and valve 98; and (2) to the irrigation well 36 through regulator 130 and valve 135. Water is mixed with ammonia to form an ammoniated liquid feed to absorber 122 through these connections when valves 135, 126 and 146 are open.

This ammoniated liquid feed, which is a water-ammonia mixture, is applied to the packing of the second stage absorber 122. The second stage absorber 122 also receives gases from the first stage absorber 120 and combines those gases in a gas-liquid contacting arrangement with the ammoniated liquid to form an ammonium nitrite-nitrate solution and mist. The liquid flows back to the first stage absorber 120 where it is oxidized to form ammonium nitrate and nitrogen oxide gases in the stripper-oxidizer section. Turbulent action in the stripper-oxidizer is necessary to accomplish the oxidation. The scrubber 128 removes further liquid and returns it to the second stage absorber 122.

Thus, the first stage absorber 120 receives nitrogen oxides from the ammonia burner, nitrogen oxides from the stripper-oxidizer section (not shown in FIG. 2) of absorber 120, water from filter 132 and the liquid from absorber 122 and scrubber 128 to form nitric acid and ammonium nitrate and cooperates with the second stage absorber 122 which receives ammonia, water and the exit gases of absorber 120. The tank 144 containing other useful fertilizer materials such as potassium ions or phosphates may be used to react with nitric acid or acidic ammonium nitrate or the like to form further solutes for application to the crops.

To increase the amount of ammonium ions in the fertilizer solution or to add other ions such as potassium ions, a three-port, two-position valve 138 has: (1) one inlet port connected to the tank 144 to receive other solutions such as potassium compound solutions; (2) the other inlet port connected to the outlet of the flow meter 150 to receive ammonia; and (3) its outlet port connected to the mixer-absorber 140 within the conduit between the outlet port of the first stage absorber 120 and the irrigation system 38.

The valve 138 may: (1) disconnect both the tank 144 and the source of ammonia so that the absorber-neutralizer 140 does not add anything to the flow of fertilizer solution from the first stage absorber 120 to the irrigation system; (2) connect the tank 144 to supply ions such as potassium; or (3) connect the source of ammonia from tank 144 to the fluid stream. A second pump 142 may be used to apply fluid from the nitrogenous fertilization system 34 into the irrigation system 38.

The pumps 134 and 142 are located between the irrigation system 38 and the absorber rather than being located between the irrigation well 36 and the absorber. Because the pumps and blower pull gases and water through the absorbers, the gases and liquids are pulled from the absorbing system. It is believed that this tends to reduce the tendency of the nitrogen oxides to adhere to solid surfaces and reside in liquid films within the absorbers and thus increases the yield of nitric acid and ammonium nitrate by forcing the nitrogen oxides to react with water or to react with each other to increase the yield in a manner to be explained hereinafter. This negative pressure also reduces the danger of leaks of toxic gases and explosions.

The absorber-neutralizer 140 and the particulate scrubber 128 may be conventional. For example, an absorber including a water spray which sprays the water over diffuser baffles and the like with the ammonia being injected into the water flowing through the absorber may be used. The valves and pumps are conventional and many alternatives may be used. Water is supplied to the scrubber 128 through valve 133 which connects it to the pressure regulator 130.

With this system, the acidic mixture of nitric acid and ammonium nitrate may be pumped directly into the irrigation system 38 to be used as top dressing to fertilize certain crops. In the alternative, there may be pumped into the irrigation system, as fertilizer, different amounts of ammonium ion or other cations such as potassium compounds to form potassium nitrate, a higher percentage of ammonium nitrate, or other nitrogenous compounds from the remainder or a larger portion of the nitric acid.

The form of nitrogen in the fertilizer solution can be tailored to fit a specific crop's needs at this juncture. For example, if it is desired to have a 50:50 ammonium:-nitrate ion ratio, neutralization is carried out with ammonia. If primarily nitrate is desired, neutralization may not be carried out. Ratios of ammonium:nitrate other than above may be obtained simply by regulating the amount of ammonia used or applied to the absorber-neutralizer 140.

Normally, unless ammonia or another compound is added in the absorber-neutralizer 140 after the nitric acid and ammonia nitrate leaves the first absorber 120, the amounts of ammonia:nitrate ions will be less than a stoichiometric ratio. This ratio may be altered in accordance with the amount of ammonia added at the absorber-neutralizer 140.

A ratio of ammonium:nitrate ions greater than the stoichiometric ration may be obtained by adding a proportion of the stoichiometric amount of the ammonium ion equal to the desired ratio, thus resulting in a neutralized solution. After the neutralized solution is detected such as with a pH meter excess ammonia can be added to the desired ratio. An economic limitation is reached at the point where the vapor pressure of the solution results in significant losses of ammonia nitrogen to the atmosphere or at the point where the deposits of calcium carbonate in equipment become excessive. Should it be desired to have a neutralized solution containing a large proportion of nitrate nitrogen, a non-nitrogeneous cation such as potassium can be used at the neutralization step.

Generally, this system of manufacturing and applying fertilizer is most suitable for use in oxidizing between three hundred and three thousand five hundred pounds of nitrogen each day and is of simpler and more economic engineering design when it is desired to oxidize from seven hundred to twelve hundred pounds of nitrogen each day to nitric oxide. Thus it is intended to oxidize between twelve and one half and one hundred forty-six pounds of nitrogen each hour and works but in the range of thirty to fifty pounds an hour. It can be scaled down for experimental models.

The system for nitrogeneous fertilization 12 in the preferred embodiment is smaller in size than centralized commercial nitrogen-forming plants. Generally, it is of such a size as to prepare an amount of nitrogen fertilizer that will provide between 30 to 50 pounds of fertilizer nitrogen in each acre-inch of irrigation water applied to a single field in the irrigation connected embodiment. The solution when transferred on a continuous flow basis to an irrigation system, is normally less than 5% nitrogen and less than four gallons of chemical process water and eight gallons of heat-exchange water are used each minute in the preferred embodiment. In other embodiments the process water used in the first stage is in the range of one gallon and twelve gallons per minute and the process water in the second stage is between 0.5 to 0.03 gallons per minute for each square foot of cross-sections. When a preponderance of nitrate is fed to a crop with this system, the nitrogen concentration of chemical process water will normally be about 2%, although wide variations in fertilizer nitrogen strength can be achieved if desired.

The system of FIG. 2 is best adapted to use on a farm directly in concert with irrigation cropping practices. The basic chemical system of FIG. 2, however, can be readily adapted to a system whereby the process-water flow rates and the heat-exchange system have been adapted to be used in other local and farm situations. This is applicable when the user wishes to obtain the advantages inherent in making non-pressure nitrogen solutions locally in a low-pressure system and intends to store the fertilizer output for subsequent use and use the heat generated for useful purposes.

Figure 3:
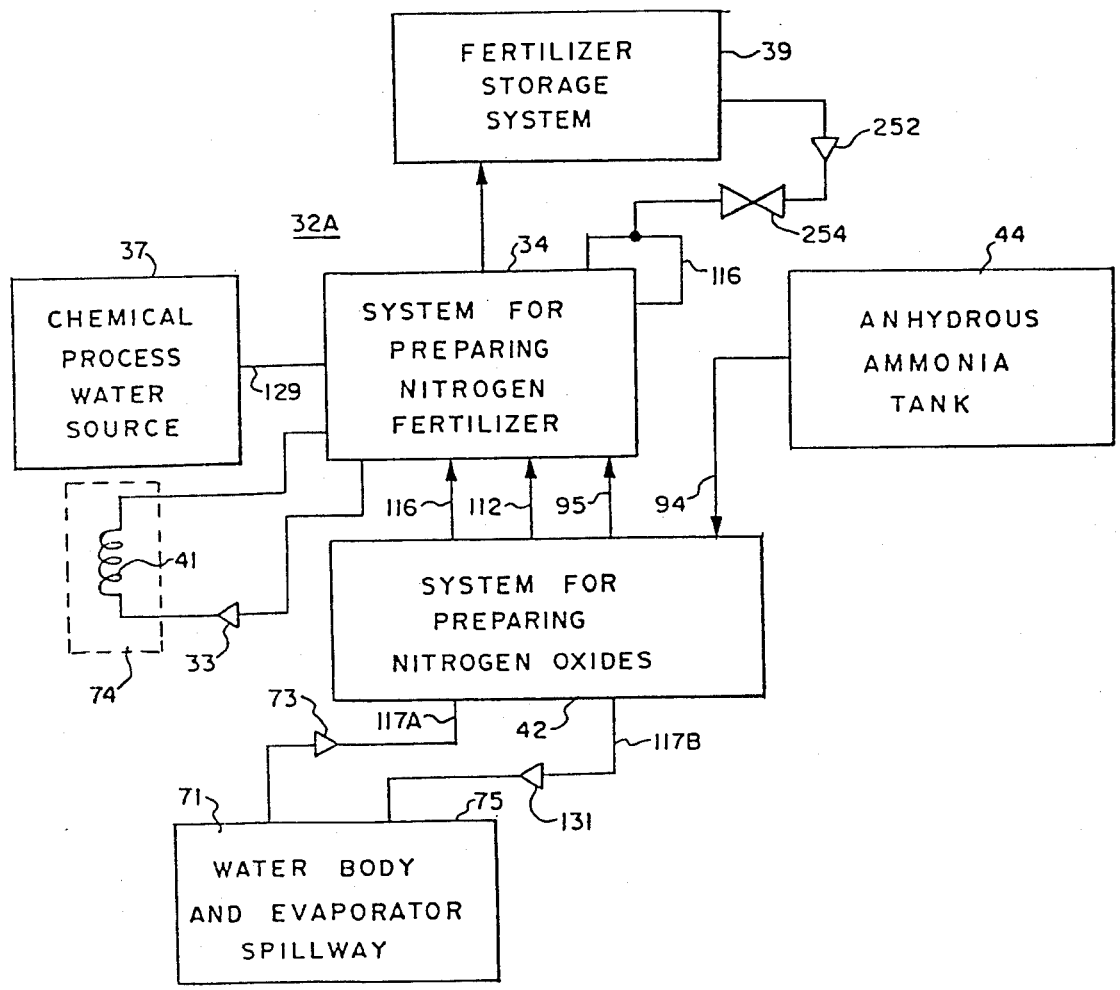
FIG. 3 is a schematic drawing of a portion of the system of FIG. 1.

In FIG. 3, there is shown an embodiment 32A of nitrogeneous fertilization similar to the embodiment 32 of FIG. 2 but having a fertilizer storage system 39, a chemical process water source 37, a heat exchange medium 74 for liquid-liquid systems and a water body and evaporation spillway 71 instead of the irrigation system well 36 (FIG. 2) and the irrigation system 38 of the embodiment of 32 in FIG. 2. The anhydrous ammonia tank 44, the system for preparing nitrogen fertilizer 34 and the system for preparing nitrogen oxides 42 in the embodiment of FIG. 3 are similar to the same parts in the embodiment of FIG. 2 and operate in the same manner.

Process feed-water rates are adjusted in this embodiment to provide a non-pressure nitrogen solution containing from approximately 6% to 21% nitrogen. The concentration obtained depends on the planned use of the product and the operating flows are adjusted in accordance with the user's product desires. In the embodiment of FIG. 3, the nitrogen solution is stored in a storage system 39, which may be a tank or pond, for later use and perhaps shipment by truck to a farm in the vicinity of the system 32A.

In the embodiments of FIGS. 2 and 3, more water is used than necessary to convert the nitrogen oxides to liquid fertilizer since a dilute solution is desired for application to the irrigation system and transportation costs do not cause a need for increase in concentration. A reduction in the water results in an increase in concentration and acidic ammonium nitrate from the first stage absorber 120 may be recirculated from the fertilizer storage system 39 through pump 252 and valve 254 into conduit 116 until the concentration is increased when desired for storage in the embodiment of FIG. 3. The solution may be concentrated to save storage space until the cost of recirculation, corrosive effects or salting characteristics outweight the savings in storage.

Instead of drawing water from an irrigation well, water may be obtained from any other source such as the chemical process water source 37. In the embodiment of FIG. 3, it may be drawn into conduit 129 in a manner similar to that for the embodiment of FIG. 2.

In addition to supplying fertilizer solution, the system 32A may be used to provide heat for other purposes by circulating liquid from either the first stage absorber 120 (FIG. 2) or the second stage absorber 122 (FIG. 2) through the heat exchange coil 41 by the pump 33 and heating a medium at 74. The cooling of the liquid increases the efficiency of the absorbers as well. Moreover, the anhydrous ammonia from the anhydrous ammonia tank 44 may be expanded in refrigeration coils in either absorber, thus absorbing heat and increasing the efficiency of the system.

The cooling water for application to heat-exchanger system 114 (FIG. 2) may be drawn from another source such as the water body and evaporation spillway. This water may be cooled by evaporation or heat removed from it through a heat exchanger for other purposes.

Figure 4:
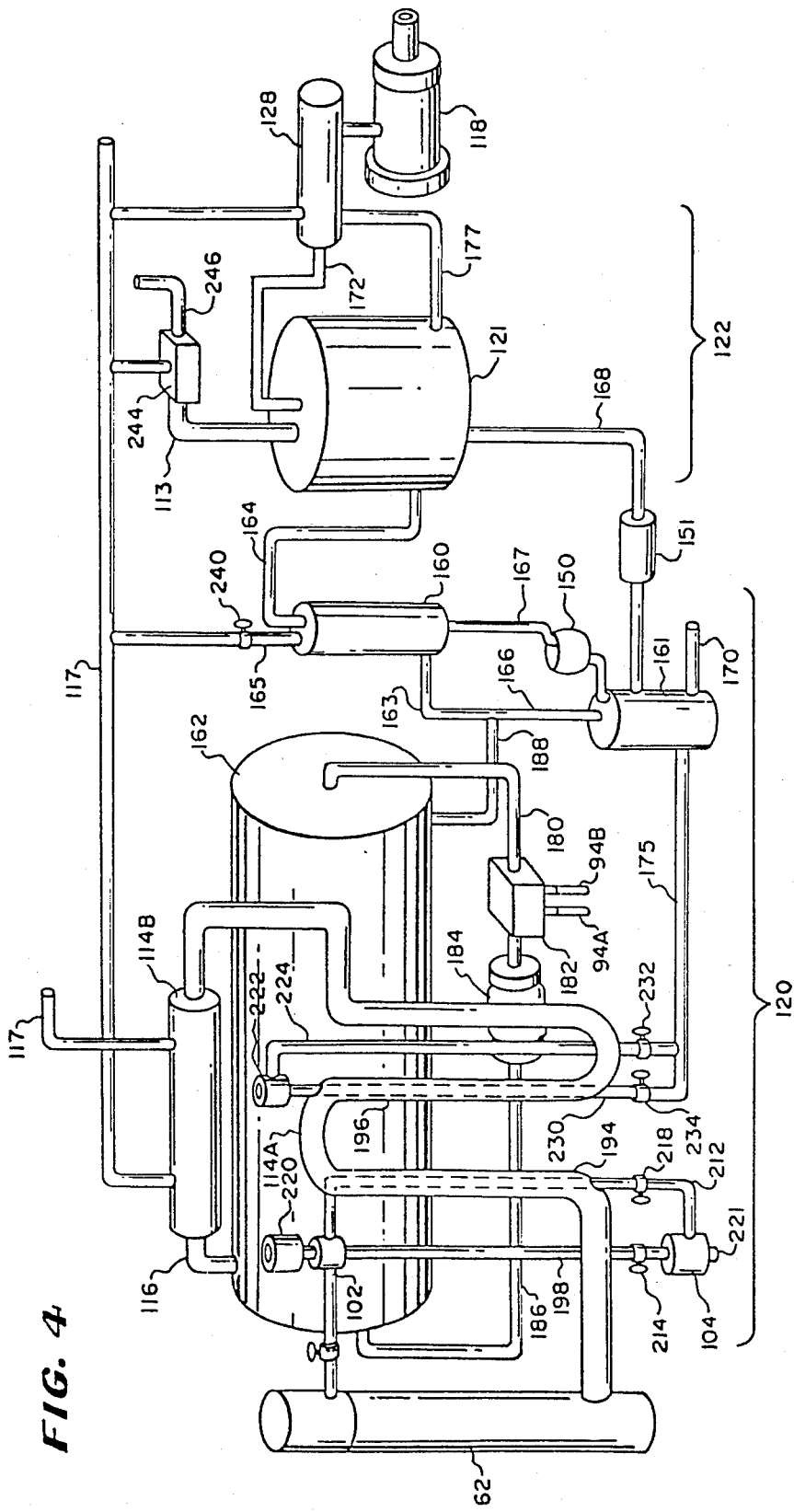
FIG. 4 is a simplified fractional perspective view of a portion of the system of FIG. 1.

In FIG. 4, there is shown a simplified perspective view of certain principal parts of the system for preparing nitrogen oxides 42 (FIG. 2) and the system for preparing nitrogen fertilizer 34 (FIG. 2) having a reactor 62, a heat exchanger 114 (FIG. 2) indicated as 114A and 114B in FIG. 4, portions of the first stage absorber 120 and the second stage absorber 122.

The first stage absorber 120 includes a gas oxidation section tank 162, a gas-liquid contacting section 160 and a stripper-oxidizer 161. The reactor 62 is connected to the gas-liquid contacting section 160 through the heat exchangers 114A and 114B in series to supply oxides thereto. The gas-liquid contacting section 160 is connected to the gas-oxidation section tank 162 to receive oxides therefrom, and the stripper-oxidizer 161 to apply nitric acid thereto and to receive nitrogen dioxide therefrom. It is also connected to the second stage absorber 122 to apply oxides thereto. The second stage absorber 122 was connected to the stripper-oxidizer section tank 161 to apply ammonium nitrite thereto.

The gas oxidation section tank 162 is a cylindrical tank having a horizontally oriented central axis of approximately 12 feet long and a diameter of 3 feet 10 inches. It is connected at its upper end through conduit 116 to the heat exchanger section 114B and at its lower end to the gas-liquid contacting section 160 through a conduit 163 and to the stripper-oxidizer section tank 161 through a conduit 166. It also includes a recirculating path including a conduit 180 connected to one of its ends, a cooling section 182, a pump 184 and a conduit 186 for pumping oxides in a recirculation path along the length of the tank 162 and cooling it in the section 182 during recirculation. Cooling section 182 may be any type of cooler such as an air cooler, water cooler or may receive conduits 94A and 94B from the ammonia tank 44 (FIG. 2) which is expanded therein to cool the oxides from the expansion of anhydrous ammonia.

While a separate tank 162 is shown to provide oxidation volume so as to form higher oxides at a controlled temperature and volume, the tank may be combined with the gas-liquid contacting section 160 and may contain the stripper-oxidation section 161 if desired. However, a tank 162 with a cooling recirculating path is efficient and may be maintained at a controlled relatively small volume for the capacities desired.

Because there is water vapor mixed with the hot oxides applied to the tank 162 which condenses out in the heat exchanger section 114B and in the tank 162 or its recirculating path, conduits 163 and 166 are connected to the bottom of the tank 162 through a single conduit 188 with the section 166 extending downwardly therefrom so that the liquid flows into the stripper-oxidizer 161 and the conduit section 163 extending upwardly therefrom to receive gases. With this arrangement the liquid, which includes nitric acid, flows to the stripper-oxidizer 161. It may also be drawn out directly to use as fertilizer in other embodiments.

In the embodiment of FIG. 4, the heat exchanger 114 is in two sections 114A and 114B but it may be one single unified section. The section 114A also provides gas to gas heat exchange to preheat air for application to the stripper-oxidizer section 161 and to the reactor 62 as well as drawing off the nitrogen oxides from the reactor 62 for application to the water cooled section 114B.

The gas to gas heat exchanger section 114A is formed of three vertical lengths of six inch diameter tubing based one foot center to center, connected at their ends and each having approximately three feet in length. The first vertical section forms a reactor-gas preheat section 194, the second section forms a stripper-oxidizer air preheat section 196 and the third section serves as a connection to the gas to water heat exchanger 114B.

The reactor-air preheat section 194 includes first and second conduits 198 and 212 each controlled by a different one of the two diaphragm or manually adjustable valves 214 and 218. Conduits 198 and 212 are each connected to a source of air from the flow meter 108 (FIG. 2) at one end and to the mixer 102 (FIGS. 2 and 4) at their other end, with the conduit 198 passing directly to the mixer 102 to provide air at the ambient temperature and the conduit 212 passing through the first vertical section of the heat exchanger 114A where it is heated by gases from the reactor 62 to which the first section 114A is connected.

With these connections, adjustment of the valve 214 may be made to provide more or less of cooler air through the conduit 198 to the mixer 102. An adjustment to the valve 218 may provide more or less of the heated air through the conduit 212 to the mixer 102. The mixer 102 receives ammonia gas through the inlet to 220 which is connected to the flow meter 96 (FIG. 2). The outlet of the mixer 102 is connected through a conduit controlled by a valve to the burning section of the reactor 62.

The stripper-oxidizer air preheat section 196 includes an air inlet at 222 and first and second conduits 224 and 230 each controlled by a different one of the manually operable diaphragm valves 232 and 234 respectively. The conduit 230 passes through the second leg of the gas to gas heat exchanger 114A and the conduit 224 passes through open air, each communicating at one end to the air outlet 222 and at the other end beyond the valves 234 and 232 with a conduit 175 connected to the stripper-oxidizer tank 161 near its bottom.

With this arrangement, the amount of preheated air in conduit 230 may be adjusted by the valve 234 and the amount of unheated air through the conduit 234 by the valve 232 to control the temperature of air entering the stripper-oxidizer section 161 through conduit 175.

The gas to water heat exchanger section 114B includes an outer tube of approximately ten feet in length surrounding the conduit 116 which enters the top of the gas-oxidizer section tank 162. The outer shell formed by the closed tube communicates with a conduit 117 which applies water to one end and permits it to flow in a direction opposite to the flow of gases into the tank 162 and out the other end. This water is a cooling irrigation water used in the system for cooling purposes and as a source of water for mixing with the nitrogen fertilizer.

Instead of the heat exchangers 114A and 114B, a single heat exchanger may be used having a six-inch by six-inch connection to the reactor 62 followed by a two-foot long expansion section which gradually increases in cross-sectional area from the six-inch by six-inch connection to a one-foot long transition conduit connected to the oxidation tank 162. The transition conduit has a one-foot by two-foot cross-section. This construction cools by expansion which leads to a phase change and thus eliminates the need for single pass water cooling.

The gas-liquid contacting section tank 160 is a cylindrical steel tank having a vertical axis approximately ten feet long and a diameter of approximately one and one-half feet. In one embodiment it includes within it a conventional packing such as plastic Koch flexings and particular benefits can be obtained by using a packing material of nickel bearing stainless steel whereby some catalytic oxidation of nitric oxide to nitrogen dioxide takes place. In another embodiment it includes, instead, sieve trays for this purpose.

The upper end of the tank 160 is connected to the conduit 117 to receive a flow of irrigating water through a valve 240 for controlling the flow thereto and with an exit conduit 242 which communicates with the second stage absorber 122. Near its lower end it communicates with the conduit 163 to receive nitrogen oxides from the gas-oxidation section tank 162 and from the stripper tank 161 and at its bottom it communicates with a conduit 167 and pump 150 in series to the top of the stripper-oxidizer tank 161 to apply nitric acid to the stripper-oxidizer section 161.

With this arrangement, nitrogen oxides flow upwardly through the tank 160 while water flows down to absorb oxides, forming nitric acid which flows through the conduit 238 in controlled amounts controlled by the pump 150 into the stripper-oxidizer 161. Gases not absorbed flow through the conduit 164 to the second stage absorber 122.

The stripper-oxidizer section tank 161 is a vertically oriented cylindrical stainless steel tank having a vertical axis of approximately five feet and a diameter of approximately two feet. It is connected at its top to conduit 166 to apply exit gases from the stripper-oxidizer to gases from the gas oxidizer tank 162 and to supply nitrogen gases, principally in the form of nitrogen dioxide through conduit 163 to the gas-liquid contacting tank 160.

The stripper-oxidizer section tank 161 is also connected: (1) at its top to the bottom of the gas-liquid contacting tank 160 through a conduit 167 and the pump 150 to receive nitric acid from the tank 160; (2) near its top through a conduit 168 and a pump 151 to the bottom of the second stage absorber 122 to receive ammonium nitrite-nitrate solution; and (3) near its bottom to the air inlet conduit 236 to receive air at a controlled temperature and to exit conduit 170 through which it applies nitrogen fertilizer liquids through the pump 134 (FIG. 2) for use in the irrigation system 38 or for storage.

The second absorber stage 122 includes an absorber tank 121 and a mixer 244. The mixer 244 is connected to the absorber tank 121 to apply ammonium hydroxide thereto and the absorber tank 121 is connected to the stripper-oxidizer section tank 161 of the first absorber stage 120 through a conduit 168 and the pump 151 which communicates with the bottom of tank 121.

The absorber tank 121 is a cylindrical steel, vertically-oriented tank having a central vertical axis approximately six feet long and four feet in diameter. It is connected: (1) at its bottom to conduit 168 to supply ammonium nitrite-nitrate solution to the stripper-oxidizer section tank 161 of the first absorber stage 120 through the pump 150; (2) near its bottom to the conduit 164 to receive nitrogen oxide gases from the gas-liquid contacting section 160; (3) near its bottom with the liquid output collector of the filter 128 through a conduit 177 through which it receives materials which have been washed from the gas stream being pumped by the blower 118 into the atmosphere from the filter 128; (4) at its top through a conduit 172 with the filter 128 to apply the tail gases thereto; and (5) at its top to conduit 117 to receive water from the irrigation system to be mixed within the second stage absorber 122 with ammonia received through a conduit 246.

The mixer 244 is connected to the top of the absorber tank 121 through a conduit 119 and to conduit 117 to receive irrigation water from the valve 135 (FIG. 2) and to a conduit 246 through which it receives ammonia from the filter 124 (FIG. 2) for mixing to provide ammonium hydroxide for application to the absorber tank 121.

The final filter stage 128 may be any purchased filter for removing sub-micron particles. Gases are pulled through it for exit to the atmosphere by the blower 118 which supplies a negative or slightly vacuum pressure to the entire system so as to prevent the escape of gases into the atmosphere.

The burner is a cylindrical tube with a height of approximately five and one-quarter feet, and a diameter of one foot, a perforated stainless steel gas distributor twelve inches down which may be a stainless steel screen and a catalyst holder approximately two and one half feet from the top with an ignitor two inches above the catalyst holder. It has an inlet near its top and an outlet near its bottom.

In operation, the ammonia oxidation reactor 62 oxidizes ammonia to nitrogen oxides and the resulting gases containing nitrogen oxides are drawn through the heat exchanger 114A and 114B through the conduit 116 into the top of the gas oxidation section tank 162 of the first stage absorber 120. A portion of the nitric oxide is oxidized to nitrogen dioxide in the gas oxidation section 162 of the first stage absorber 120.

The gases from section 162 are then passed through a conduit 163 to a gas-liquid contacting section tank 160. Water is fed through conduit 117 to the gas-liquid contacting section tank 160 and nitric acid is formed in this section. The nitric acid is transferred through conduit 167 by pump 150 to the stripper-oxidizer 161 of the first stage absorber.

The gases exiting the gas-liquid contacting section 160 of the absorber 120 flow through a conduit 164 into the second stage absorber 122. There the gases are contacted with ammoniated water in a packed column. The ammoniated water is formed from water flowing through conduit 117 and ammonia from conduit 119. The nitrogen oxides and ammonium hydroxide form an ammonium nitrite-nitrate solution absorbing the remainder of the nitrogen oxide gases in the system flow.

The ammonium nitrite-nitrate solution formed in absorber 122 is transferred through conduit 168 by pump 151 to the stripper-oxidizer 161 of the first absorber stage 120. There it is rapidly mixed in the stripper-oxidizer with the nitric acid from the first absorber stage 120. The ammonium nitrite in the liquid is reacted under the conditions maintained in the stripper-oxidizer to form ammonium nitrate with the nitrogen oxide gases formed being principally nitrogen dioxide.

To oxidize nitrite to nitrate with high yields, it is desirable to maintain the pH below a pH of 2 and to have vigorous aeration and mixing of the liquid. In the preferred embodiment, the pH is less than 0.2. Further, it is desirable that the air introduced for oxidation and agitation be heated to most effectively strip gases from the solution. Depending on the pressure used for operation, pumps may be needed to facilitate liquid flows in conduits 167 and 168. Under positive pressure conditions, pumps are not necessary.

The nitrogen oxides exiting from the stripper-oxidizer 161 are transferred through a conduit 166 to conduit 163 and then to the liquid-gas contacting tank 160. Since these oxides are principally nitrogen dioxide, nitric acid is formed efficiently from the gases evolved from the stripper-oxidizer. The liquid exiting from the stripper-oxidizer is an acidic ammonium nitrate nonpressure nitrogen solution that can be used for further treatment or directly as a fertilizer.

The gases remaining after conversion of nitrogen oxides to nitrogen fertilizer within the capability of the equipment are drawn into the filter 128 by the blower 118 and scrubbed. The liquid from the scrubber is recirculated back to the second stage absorber tank 121.

Figure 5:
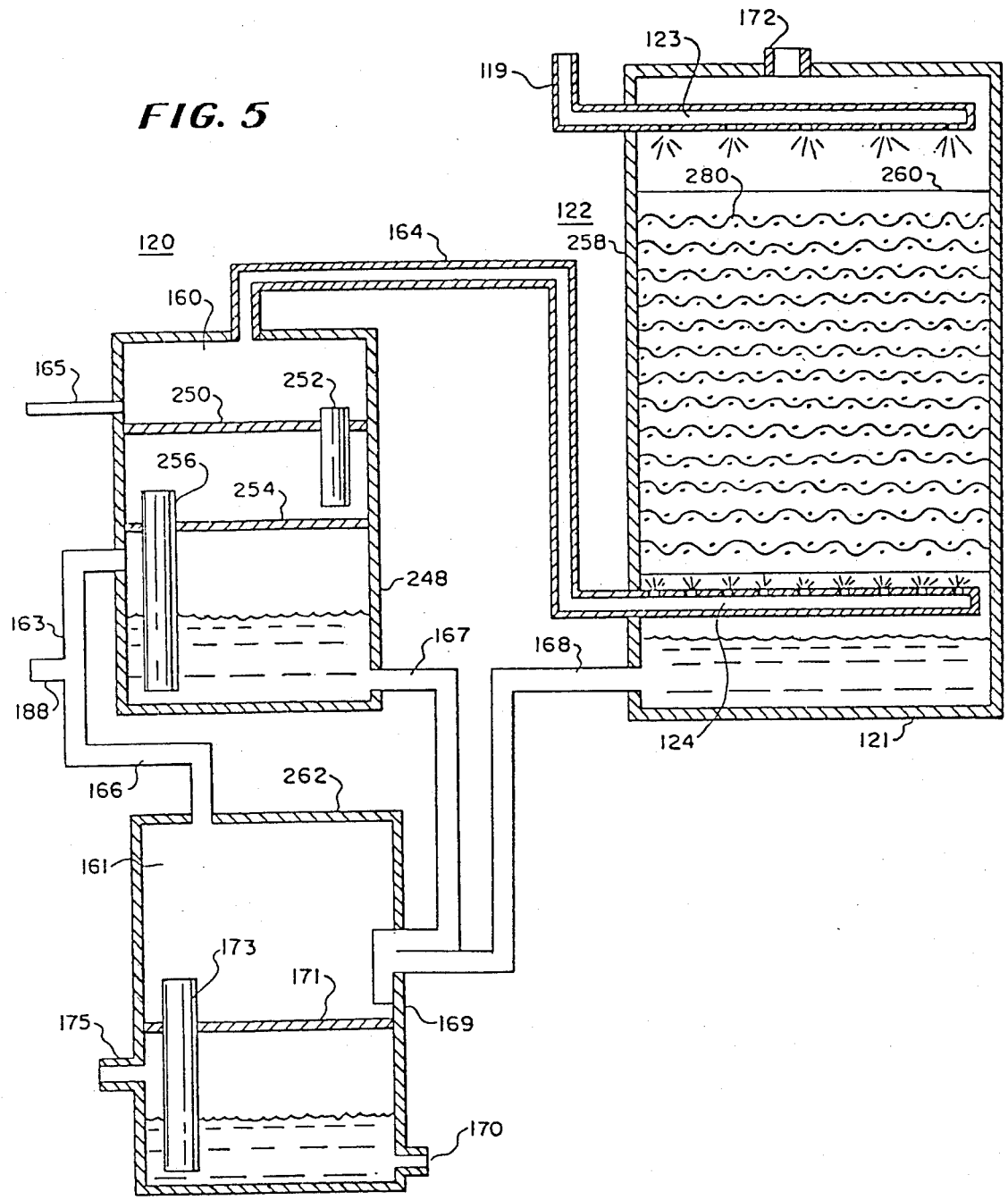
FIG. 5 is a schematic diagram of a portion of the system of FIG. 1.

In FIG. 5, there is shown a sectional view of portions of the first stage absorber 120 and the second stage absorber 122 having the gas-liquid contacting section tank 160, the stripper-oxidizer section tank 161 and the second stage absorber tank 121. As shown in this view, the gas-liquid contacting section tank 160 communicates with the second stage absorber tank 122 through a conduit 164 and with the stripper-oxidizer section tank 161 through conduits 166 and 167. the stripper-oxidizer section tank 161 communicates with the first stage absorber tank 120 through a conduit 168.

The gas-liquid contacting section tank 160 includes a cylindrical wall 248 forming a stainless steel compartment, a first sieve tray 250, a downcomer tube 252, a second sieve tray 254 and a second downcomer tube 256. Conduit 165 communicates near the top and above sieve tray 250 to cause water to flow through it and down the downcomer tube 252 to a location above the sieve tray.

Beneath the sieve tray 254 and the lowest compartment, conduit 166 communicates with the interior of the gas-liquid contacting section tank 160 to apply nitrogen oxide gases to this compartment from conduit 188 which are separated from the liquid at that point. The liquid flows to the stripper-oxidizer tank 161 through conduit 166. The gases applied to the gas-liquid contacting tank 160 flow upwardly through the sieve trays 254 and 250 where they are contacted with water and result in nitric acid flowing down to the bottom of the gas-liquid contacting section tank 160. Gases which are not absorbed pass through the conduit 164 into the second stage absorber tank 121. Nitric acid from the bottom of the tank communicates with the inlet to conduit 167 which leads to a lower gravitational level into the stripper-oxidizer tank 161.

Instead of sieve trays, the gas-liquid contacting section tank 160 may include packing of any suitable type or bubbling caps or any other arrangement for causing the water and gas to be intimately contacted and mixed to absorb as much as possible of the nitrogen dioxide and thus result in nitric acid. Moreover, it may be combined with the oxidization volume or the stripper-oxidizer tank 161 into one or more units. Similarly, instead of relying upon gravity, pumps may be used to separate the gases from the liquids in conduit 166 and to cause liquids to flow downwardly through conduits 166 and 167 while gases flow up through conduit 164.

The second stage absorber tank 121 includes a stainless steel wall 258 forming a compartment, having three horizontally spaced sections, which are: (1) a packing material section 260; (2) a lower distributor section having a lower distributor pipe 124 and (3) an upper distributor section having an upper distribution pipe 123.

The packing material section 260 is in a central portion of the stripper tank 121 and above it is an upper distributor 123 connected to conduit 119 through which ammonium hydroxide is distributed on the packing material 280 beneath it and beneath the packing material section 260 is a lower distributor pipe 124 which communicates with the conduit 164 to admit nitrogen oxide gases which flow upwardly through the packing material section 260 to contact the ammonium hydroxide.

The distributor 123 is a continuation of the pipe 116 having spaced along its length a plurality of spaced apart openings through which the ammonium hydroxide flows. Similarly, the distributor 124 is a continuation of the conduit 164 containing along its upper and lower surface a plurality of spaced apart apertures which distribute the nitrogen oxides. Through the top of the compartment of tank 121 is an opening which communicates through a pipe 172 with a filter 128 to remove the entrained particulate materials.

Beneath the distributor 124, the conduit 168 communicates with the interior of the tank 121 to enable the ammonium nitrite-nitrate solution to flow downwardly into the stripper-oxidizer tank 161. The ammonium nitrite and the ammonium nitrate are formed by the gases flowing upwardly and contacting the ammonium hydroxide on the surfaces of the packing material section 260.

The stripper-oxidizer section tank 161 includes stainless steel walls 262, a stripper-oxidizer plate 171 and a downcomer 173. The conduit 166 passes between the gas-liquid contacting section tank 160 and the top of the walls of the stripper-oxidizer tank 161 to permit the flow of nitrogen oxides therethrough.

The stripper-oxidizer plate 171 separates the interior of the stripper-oxidizer tank 161 into two compartments, with the conduit 175 and the conduit 170 entering the first compartment and the conduit 166 entering the top compartment so that the nitric acid and ammonium nitrite-nitrate solutions enter and mix in cup 169 and then flow across the stripper-oxidizer plate 171 to the top of the downcomer 173 which passes through the stripper-oxidizer plate 171 causing the acidic ammonium nitrate solution to flow into the bottom compartment where it may exit through conduit 170. Heated air passing through conduit 175 causes turbulence in the top compartment of the stripper-oxidizer plate 171 so that the ammonium nitrite-nitrate and nitric acid flowing through conduits 167 and 168 to the junction at 169 where they are mixed are further exposed to oxygen and turbulence to cause rapid mixing of the ammonium nitrate and ammonium nitrite with nitric acid causing an immediate lowering of the pH of the ammonium nitrite-nitrate solution before decomposition can take place and quick oxidation of the ammonium nitrite to ammonium nitrate with the evolution of nitrogen oxide gases.

The gases exiting the gas oxidation section tank 162 (FIG. 4) are passed through the conduits 166 and 163 to a gas-liquid contacting apparatus 160 consisting of a sieve tray, bubble cap or packed column arrangement which receives water from conduit 165 at the top of the apparatus. A sieve tray apparatus is used in the preferred embodiment and the gases enter at the bottom of the apparatus and flow countercurrent to the liquid. If a packed column is used, the flow may be cocurrent.

Substantially all of the nitrogen dioxide in the gas mixture is absorbed and reacted with the water in the gas-liquid contacting section tank 160 to form nitric acid and nitric oxide. The gases not absorbed, as well as the NO formed in this stage, are passed on to the second stage absorber 122. It is generally accepted in the art that nitric acid formed in this manner results from many intermediate reactions and there is wide disagreement as to the specific steps that are involved in the reaction, but there is agreement that the overall stoichiometry resulting from the various proposed reactions is substantially that of three molecules of nitrogen dioxide and one molecule of water yielding two molecules of nitric acid and one molecule of nitric oxide.

The nitrogen oxides exiting the gas-liquid contacting section tank 160 are comprised principally of nitric oxide. Recovery of the nitrogen oxides is done without the use of high pressure and in only one further absorption stage utilizing a different chemical process than the first stage.

The second absorption stage 122 is arranged to communicate with the first absorption stage and: (1) effectively use the product of the first absorption stage to further oxidize the products of the second absorption stage to make an ammonium nitrate solution direction; and (2) efficiently recirculate the nitrogen oxides formed in the process through the gas-liquid contacting apparatus 160 to facilitate nitric acid formation from the exit gases of the ammonium nitrite oxidation process in the stripper-oxidizer 161.

Specifically, the inert gases and nitrogen oxides, which are principally nitrogen oxide, that exit the gas-liquid contacting section tank 160 pass through a conduit 164 and distributor 124 to the second stage packed absorber 122. The reaction liquid fed to absorber tank 121 to wet the packing is ammoniated water and is fed through a distributor 123. The ammonia rate is regulated to keep the pH of the liquid in absorber tank 121 above pH 6.7 and preferably between pH 8.0 and pH 8.4.

The packing of absorber tank 121 can be any of a variety of materials commonly known in the art to be efficient in gas-liquid contacting. In the preferred embodiment, 1½-inch plastic rings sold under the trademark Koch Flexirings have been found to be effective.

The oxides react rapidly in both the liquid and gas phases continuously to form an ammonium nitrite-nitrate solution, which is collected in the bottom of absorber tank 121. The high pH solution collected in the bottom of absorber tank 121 is transferred through conduit 168 to the mixing chamber 169 of the stripper-oxidizer 161. There it is combined with the flow from conduit 167, which is primarily nitric acid that is produced in the gas-liquid contacting tank 160. The two liquids are mixed rapidly in the mixing chamber and then flow from the mixing chamber across the stripper-oxidizer plate 171 and the resultant acidic ammonium nitrate product is transferred through a downcomer 173 to the bottom, or liquid collection zone, of the stripper-oxidizer 161. The acidic ammonium nitrate solution is available for direct use as a fertilizer or for further processing to make another desired fertilizer product.

The flows of ammonium nitrite-nitrate solution from absorber 122 must be mixed very rapidly in the stripper-oxidizer section tank 161 with the nitric acid flow from the gas-liquid contacting section tank 160 and the pH of the resultant solution must be maintained below pH 2.0 and it is best if it is maintained below pH 0.2.

It is desirable to rapidly lower the pH upon mixing the two liquids and to maintain it below the point at which an ionic reaction that decomposes ammonium nitrite into nitrogen and water occurs. Tests have shown that this reaction takes place minimally at pH's below 2 and above 6.7 and that it is further minimized at both lower and higher pH's. Loss of ammonium and nitrite ions as gaseous nitrogen can thus be substantially avoided by pH control.

Air is fed to the stripper-oxidizer section tank 161 through conduit 175 after preheating it in conduit 230 of heat exchanger 196. It is desirable to heat the air to obtain a proper stripping action and a temperature between 250 and 300 degrees Fahrenheit has been found to be particularly effective. The stripper tray 171 and the mixing cup 169 are perforated to apportion the heated air feed properly. Alternatively, when desired, air feed can be taken through a suitable conduit directly from the atmosphere.

The chemistry taking place in the stripper-oxidizer section tank 161 is complex but it is believed that the main two reactions taking place are: (1) the reaction of one molecule of ammonium nitrite with two molecules of nitric acid to yield one molecule of ammonium nitrate, two molecules of nitrogen dioxide and one molecule of water; and (2) the reaction of two molecules of ammonium nitrite with one molecule of gaseous oxygen to yield two molecules of ammonium nitrate. These reactions are believed to be the principal reactions because the liquid product resulting is substantially an acidic ammonium nitrate solution and the primary nitrogen oxide exiting stripper-oxidizer section tank 161 through conduit 166 is nitrogen dioxide.

It seems probable that two other reactions take place to some extent, which are: (1) the reaction of two molecules of nitrous acid with oxygen to form two molecules of nitric acid; and (2) the reversible decomposition of three molecules of nitrous acid into one molecule of nitric acid, two molecules of nitric oxide and one molecule of water. The important thing, however, is that the reaction of ammonium nitrite forming gaseous nitrogen and water, which is ionic in nature, is avoided by controlling the pH and thus the ionization of the ionic species involved in this reaction is prevented, thereby giving efficient conversion of the oxides of nitrogen to an ammonium nitrate solution. Rapidly formed ammonium nitrite is used as a vehicle to facilitate oxide absorption while avoiding its destruction to gaseous nitrogen by pH control.

To remove submicron particles of ammonium nitrite and ammonium nitrate from the tail gas stream, the gases exiting from the top of the absorber tank 121 are channeled into the conduit 172 for passage through a final filter stage 128.

In FIG. 6, there is shown an elevational view of the reactor 62 having a top gas-distributor section 201 and a bottom section 203. The bottom section 203 includes a flanged cylindrical main body 209, a connecting section 211 of the nitrogen oxide conduit 158 and a catalyst holder 213 with the flange being shown at 219. The top section 201 includes a flanged top cylindrical outer housing 215, a distributor baffle 217 and a bottom flange at 219 adjacent to the flange of the bottom section. The top and bottom sections 215 and 209 abut each other with their flanges meeting at 210 and with their longitudinal axes aligned to form a single unit, the interiors of which are in communication.

The catalyst fits on or in the catalyst holder 213 and is held in place therein between the top and bottom sections 201 and 203 for easy replacement. The outlet section 211 for the bottom section 203 is connected to conduit 158 by flanges so that the two sections communicate with each other. The preheat conduit 212 passes through conduit 158 and communicates with top section 201 and valves 218 and 214 to ration the amount of air passing through 218 versus the non-heated bypass and thus heat the air prior to mixing with ammonia and movement through the main housing of the reactor 62. Ammonia entering the top section 201 and 220 is mixed with the preheated air at 102.

In FIG. 7, there is shown a sectional view of the reactor 62, showing the arc-type igniter 227 mounted above the catalyst 229 which, in one embodiment, is platinum gauze sandwiched between the flanges of 209 and 215 and resting on the catalyst holder 213. A suitable platinum alloy catalyst gauze is sold by Englehand Industries of Carteret, N.J. In another embodiment, the catalyst is cobalt oxide pellets held in the catalyst holder 213, which is inverted to become a basket. One suitable type of cobalt oxide catalyst is sold by En-Ren, Inc. of Cincinnati, Ohio.

The arc-type igniter is a conventional igniter for gas heaters mounted approximately two inches from the catalyst and having approximately 0.060 spark gap and one and one-fourth-inch electrodes. Above the igniter 227 within the housing is a preforated-plate gas distributor 217 which permits the heated gases to flow evenly over the catalyst and through the connecting section 211 to the heat exchanger 158 and heats the incoming air. This provides a potential of 4 KV across the spark gap for a voltage gradient of approximately 65 KV per inch.

The potential gradient is increased to a value sufficient to break down the ammonia air mixture and ignite it. In the preferred embodiment an AC potential of 4 KV is produced and the ammonia added at 220 is slowly increased until it ignites. The concentration at this point must be sufficient to cause a flow of burning ammonia from the arc lighter 227 to the catalyst at 229.

Generally the concentration of ammonia and the potential gradient are selected so that ammonia will ignite at ambient temperature but is low enough so as to not explode the reactor 62 at substantially atmospheric pressure. The concentration of ammonia and air and the velocity of gas and spacing between the arc igniter 227 and catalyst at 229 are selected so that the flame is carried to the catalyst at 229 to sustain a reaction. Thus the concentration of ammonia varies with spacing between the igniter and catalyst, potential gradient of arc, flow rate of gas and ambient temperature and may be determined empirically. The spacing and potential gradient should contemplate a temperature range of between 10 degrees below zero Fahrenheit to 110 degrees above zero Fahrenheit to permit easy adjustment of concentration for ignition at different temperatures without changing the potential to the igniter, spark gap adjustment or adjustment in catalyst-igniter spacing.

In operation, heated air enters the upper section 201 through conduit 102. Ammonia enters the upper compartment at opening 220 which communicates with an ammonia supply. When the mixture of air and ammonia reaches the catalyst 229, it is burned to provide nitrogen oxides, which continue through the lower section 203 and the connecting section 211, flowing from there to the heat exchangers.

The spark in the gap of the igniter 227 begins an ammonia-air flame which touches the catalyst, allowing the reaction to start on the catalyst, and the catalyst is immediately covered. This is accomplished without preheating and the reaction is self-sustaining within thirty seconds. Once the heated gases from burning heat the incoming air and ammonia, the burning is not only self-sustaining but reaches maximum conversion efficiency within five minutes at the higher temperature. The ammonia is oxidized at temperatures within the range of 1,000 degrees F. to 2,000 degrees F., depending on the pressure and catalyst.

In FIG. 8, there is shown a fragmentary, sectional view of the arc-type igniter 227 and the catalyst 229 mounted within the top section of the reactor. The igniter may be a conventional gas-heater spark ingniter 227 threaded into the wall 215 and having terminal 241, a ceramic insulator 243, a casing 245, metal ring 247, a first electrode 249 and a second electrode 251.

The terminal 241 is electrically connected through the center of the igniter to the first electrode 249 and the second electrode 251 is connected to the copper ring, which is grounded in the wall 215. Consequently, high potential applied to the terminal 241 results in a spark which ignites the ammonia-air mixture, causing the flame to spread to the catalyst 229, which in the preferred embodiment, is approximately two inches from the spark gap but may be closer or further, depending on concentration, rate of flow and temperature of the gas. It should not be so close as to contaminate the catalyst nor so far as to enable the flame to be extinguished before igniting the ammonia at the catalyst.

The catalyst 229 may be platinum-based gauze or cobalt oxide-based catalyst pellets with the gauze being supported on a catalyst holder 213 and the cobalt oxide pellets being held in a wire basket as shown in FIGS. 6 and 7.

In the operation of the preferred embodiment ammonia is converted into liquid nitrigon fertilizer in a series of reactions shown in equations 1-14. These reactions are in some cases accepted as a summary of several intermediate reactions and provide stoichiometric relationships between the molecules. For example,

EQUATION 1

$$4NH_3 + 5O_2 \rightarrow 4NO + 6H_2O$$

EQUATION 2

$$2NO + O_2 \leftrightarrow 2NO_2 \leftrightarrow N_2O_4$$

EQUATION 3

$$3NO_2 + H_2O \leftrightarrow 2HNO_3 + NO$$

EQUATION 4

$$2NO_2 \text{ or } (N_2O_4) + H_2O \leftrightarrow HNO_3 + HNO_2$$

EQUATION 5

$$NO + NO_2 \leftrightarrow N_2O_3$$

EQUATION 6

$$N_2O_3 \text{ or } (NO + NO_2) + H_2O \leftrightarrow 2HNO_2$$

EQUATION 7

$$N_2O_3 + 2NH_4OH \leftrightarrow 2NH_4NO_2 + H_2O$$

EQUATION 8

$$2NO_2 + 2NH_4OH \leftrightarrow NH_4NO_2 + NH_4NO_3 + H_2O$$

EQUATION 9

$$NH_4^+ + NO_2^- \rightarrow N_2 + 2H_2O$$

EQUATION 10

$$2HNO_2 + O_2 \leftrightarrow 2HNO_3$$

EQUATION 11

$$3HNO_2 \leftrightarrow HNO_3 + 2NO + H_2O$$

EQUATION 12

$$NH_4NO_2 + 2HNO_3 \rightarrow NH_4NO_3 + 2NO_2 + H_2O$$

EQUATION 13

$$2NH_4NO_2 + O_2 \rightarrow 2NH_4NO_3$$

EQUATION 14

$$NH_3 + H_2O \leftrightarrow NH_4OH$$

equations 2,5,6,7 and 8 are believed to be the most significant reactions occuring during the absorption of nitrogen oxides in absorber 122, and reaction 7 is believed to be the dominant reaction taking place in the liquid and vapor phases. Reactions 2 and 5 are believed to be the primary reactions in the gas phase.

In operation, nitric oxide is obtained by the burning of ammonia using a catalyst as shown in the reaction of equation 1. The ammonia-air mixture is ignited without preheating the gases by means of a small arc such as that provided by a gas heater igniter. The nitric oxide formed in the burner is cooled, mixed with oxidation air and transferred through an oxidation volume sufficiently large to permit the major portion of the nitric oxide to be oxidized to nitrogen dioxide as shown in the reaction of equation 2.

Sparking the air-ammonia mixture with the igniter and with a mixture of ammonia and air that includes more ammonia than normal causes an immediate burning reaction, even with cold gases, which starts the reaction of equation 1 on the catalyst. The igniter is then switched off to prevent pre-ignition before the gases reach the catalyst. This is accomplished without preheating and the reaction is self-sustaining within thirty seconds. Once the heated gases from burning, heat the incoming air and ammonia, the burning is not only self-sustaining but reaches maximum conversion efficiency within five minutes at the higher temperature.

Under the steady-state running conditions, air and ammonia are drawn into the mixer 102 from ports 220 and 221 to filter 104 and from the mixer 102 into the air preheat exchanger tube 212 through conduit 158. The preheat exchanger tube 212 is a tube which passes through one leg of heat exchanger 158 and converts to mixer 102. The gases are mixed and evenly distributed as they pass through the conduit 102, the upper burner chamber 201 and the gas distributor 217. The preheated and mixed gases pass over the catalyst 229, which is supported by the catalyst holder 213.

The burning of the ammonia with oxygen creates nitric oxide and water as shown in the reaction of equation 1. As the products of combustion are cooled, the nitric oxide reacts with oxygen to form nitrogen dioxide, as shown in the reaction of equation 2. These gases flow through the heat exchanger 158 to heat incoming air and ammonia and later flow through the heat exchanger, as described above.

As the reaction occurs, the incoming air for the process is preheated in the heat exchanger 158 and the ratio of air to ammonia is adjusted to that desired for steady-state running of the process and to favor the oxidizing of ammonia of nitric oxide and water. This ratio, as is well known in the art, depends on the catalyst used and the degree of incoming gas preheat. For example, a lower reaction temperature is needed for the cobalt catalyst than for the platinum catalyst system and this is obtained primarily by adjusting the ratio of ammonia to air in the gas mixture to be burned and by regulating preheat through adjusting the portion of the incoming air which passes through the preheater 190 versus the preheater bypass 191.

The ammonia is oxidized primarily according to the reaction of equation 1 and the gases formed are transferred through the bottom section 209 of the converter to the inlet 211 of the air-gas heat exchanger 158. Heat from the burner exit gases is taken through heat exchanger 158 around the air preheat exchanger tube 212 (FIG. 6). Additionally, heat is dissipated from heat exchanger 158 or captured for use if desired. The gases leave the heat exchanger 158 at approximately 500 degrees Fahrenheit and pass through the water-gas heat exchanger 114 (FIGS. 2 and 4), where they are rapidly cooled to 80 to 90 degrees Fahrenheit. In heat exchanger 114, the water formed in the reaction of equation 1 is substantially condensed and drains into the stripper-oxidizer section tank 161 (FIGS. 4 and 5).

The gas exiting the ammonia oxidizer is transferred to a first absorbance stage where it is contacted with water to form nitric acid through a combination of reactions which are normally accepted in the art as being summarized by the reaction of equation 3. The nitric acid solution formed from the nitrogen dioxide and water is collected at the bottom of the gas-water contacting zone and transferred continuously to a stripper-oxidizer of the first absorbance stage. The gases not absorbed in the water-gas contacting zone of the first absorbance stage and the nitric oxide produced in the reaction of equation 3 are passed to the second absorbance stage. Some of the nitric acid may be directly removed and used and the remainder passed to the stripper-oxidizer section.

These gases are mixed with air to promote the oxidation of nitric oxide in the gas mixture to nitrogen dioxide in the oxidation chamber of the gas oxidation section tank 162 as shown in equation 2. The reaction shown in equation 2 is a slow reaction, exothermic in nature, and has a negative temperature coefficient so the heat given off from the reaction slows the reaction. This reaction may be increased by cooling such as by expanding anhydrous ammonia in a coil in the gas oxidation section tank 162.

As the nitrogen dioxide concentration in the gas mixture increases and the nitrogen monoxide concentration decreases, the reaction progresses extremely slowly. Therefore, that portion of the nitric oxide which converts relatively rapidly to nitrogen dioxide under the chosen operating conditions (size and cooling) is reacted in the gas-oxidation section tank 162 with a minimum requirement of forming enough nitrogen dioxide so that the ratio of nitrogen dioxide to nitric oxide is greater than one in the combined gases exiting the gas oxidation section tank 162 and the stripper-oxidizer section tank 161. This ratio limitation is necessary in order that the chemistry of the reaction shown in equation 3 predominates over that of equation 6 when the gases entering gas-liquid contacting section tank 160 are reacted in the gas-liquid contacting section tank 160.

The chemistry of the reaction shown in equation 3 is favored by a high ratio of nitrogen dioxide to nitric oxide which is maintained in the gases entering the gas-liquid contacting section 160 to furnish nitric acid for later transfer to the stripper-oxidizer section tank 161 for use as an oxidizing medium to convert the ammonium nitrite formed in and transferred from absorber 122, to ammonium nitrate. In the preferred embodiment, approximately 75% of the nitric oxide in the gas mixture entering the gas oxidation section tank 162 is converted to nitrogen dioxide.

No high pressure conditions and no successive stages for carrying out the reactions of equations 2 and 3 are required as the conversion of nitric oxide to nitrogen dioxide is relatively easy at the high oxide concentrations without the use of high pressure and the remaining oxides exiting the gas-liquid contacting section tank 160 are absorbed by a combination of physical and chemical processes and apparatus at atmospheric or sub-atmospheric pressures in absorber 121, However, high pressure could be used in the converter and operate in a satisfactory manner.

The gases exiting the gas oxidation section tank 162 are passed through the conduit 163 to a gas-liquid contacting section tank 160 consisting of a sieve tray, bubble cap or packed column arrangement which receives water from conduit 165 (FIG. 4) at the top of the apparatus. A sieve tray apparatus is used in the preferred embodiment and the gases enter at the bottom of the apparatus and flow countercurrent to the liquid. If a packed column is used, the flow may be cocurrent.

Substantially all of the nitrogen dioxide in the gas mixture is absorbed and reacted with the water in the gas-liquid contacting section tank 160 to form nitric acid and nitric oxide according to the reaction of equation 3. The gases not absorbed, as well as the nitric oxide formed in this stage, are passed on to the second stage absorber 122. It is generally accepted in the art that the nitric acid formed in this manner results from the overall reaction of the equation 3. Many intermediate reactions have been proposed and there is wide disagreement as to the specific steps that are involved in the reaction of equation 3 but there is agreement that the overall stiochiometry resulting from the various proposed reactions is substantially that of the reaction of equation 3.

The packing geometry, packing volume, packing surface area, free space, liquid flow rate, liquid characteristics, gas velocity and gas characterstics of the second absorption stage are arranged to obtain rapid and efficient removel of nitrogen oxides from the gas stream, facilitated primarily by maintaining a steady-state, non-equilibrium thermodynamic chemical state in the system. The liquid of the second stage packed column is ammoniated water. The liquid is ammoniated and distributed on the packing so as to maintain the second stage liquid pH between 6.7 and 8.5 while thoroughly wetting the packing.

Nitrogen oxides entering the second stage from the first stage are principally in the form of nitric oxide rather than nitrogen dioxide. By maintaining a preponderance of nitrogen monoxide in the nitrogen oxides entering the second stage, a proper packed column geometry, adequate material flux and a high pH in the liquid through ammoniation, the reaction of equations 2, 5 and 7 are facilitated in the second stage. The ratio of nitric oxide to nitrogen dioxide is maintained at a level greater than one in this stage.

Although the reaction of equation 2 is normally characterized as a slow reaction and high pressure is normally considered necessary to carry it to essential completion in a practical manner, it is relatively rapid in the second stage absorption process of this system, where the molar ratio of nitric oxide to nitrogen dioxide is large. In the second stage gas phase, as nitrogen dioxide is formed, it is used in the formation of dinitrogen trioxide in the reaction of equation 5, which is a very rapid reaction.

As dinitrogen trioxide is formed in the packing free space, it is in close proximity to the wetted packing surface. This facilitates contact with the wetted surface as the gases are moved through the packing so the dinitrogen trioxide is rapidly removed from the gas phase through the formation of ammonium nitrite in the reaction of equation 7, which is also a rapid reaction. Thus, nitrogen oxides are quickly and easily removed from the gas phase without a major dependence on carrying the reaction of equations 2 and 3 to the right through the use of high pressure as is necessary in the normal commercial process.

Specifically, the inert gases and nitrogen oxides, which are principally nitric oxide, that exit the gas-liquid contacting section tank 160 pass through a conduit 164 and distributor 124 to the second stage packed absorber 122. The reaction liquid fed to absorber 122 to wet the packing is ammoniated water and is fed through a distributor 123. The ammonia rate is regulated so as to keep the pH of the liquid in absorber 122 above pH 6.7 and preferably between pH 8.0 and pH 8.4

The packing of absorber 122 can be any of a variety of materials commonly known in the art to be efficient in gas-liquid contacting. In the preferred embodiment, 1½ inch Koch Flexirings have been found to be effective. In some embodiments, potassium hydroxide or other cation bases may be used instead of part or all of the ammonium hydroxide. If ammonium hydroxide is not used at all as the reaction liquid, the pH requirements may generally be relaxed.

When the gases enter the absorber 122, the nitrogen oxides are predominantly in the form of nitric oxide. A number of reactions can be postulated as occurring in absorber 122 but those most likely to occur are given in equations 2 through 13.

The absorption of nitrogen oxides in absorber 122 is the result of a combination of several of these reactions and it is believed that the most significant reactions are the reactions of equations 2,5,6,7 and 8, with reaction 7 being the dominant reaction taking place in the liquid and vapor phases and reactions 2 and 5 being the primary reactions in the gas phase. The oxides clearly react rapidly in both the liquid and gas phases continuously to form an ammonium nitrite-nitrate solution, which is collected in the bottom of absorber 122.

The reaction of equation 9 is an ionic reaction in which the positive ammonium ion combines with the negative nitrite ion to form gaseous nitrogen and water. By maintaining the pH of the second stage liquid above pH 6.7 and preferably at about 8.4 and thus minimizing ion formation, the potential for reaction 9, which is ionic in nature, is essentially eliminated. Thus, the packing geometry, packing volume, free space, liquid flow rate and gas velocity of the second stage are arranged and combined to facilitate the formation of dinitrogen trioxide by the reaction of equation 5 in the gas phase of the second stage and further to immediately contact the dinitrogen trioxide formed with the vapor and wetted packing surfaces of the second stage, causing the rapid and continuous formation of ammonium nitrite in the reaction of equation 7 in the liquid and vapor phases. Some ammonium nitrate is found in the liquid in the second stage as well as ammonium nitrite so it seems probable that some combination of the reactions of equations 3,4,8 and 13 occurs to an appreciable extent in the second stage but their occurrence is minor as contrasted to the extent to which reactions 2,5 and 7 occur. Consequently, the liquid effluent from the second absorber stage is an ammoniacal ammonium nitrite-nitrate solution.

It has been found that the lineal velocity of gas flow through the second stage packing is most effective at lower rates than for standard packed column design (up to 12 times slower) and, likewise, extremely low liquid flow rates per unit of packing cross section (up to 17 times less) are found to be more effective than results obtained with standard packing column recommendations as described in Chemical Engineering Handbook, published by McGraw Hill, 1973, New York, N.Y., pages 18–30. The rate is between 0.5 and 0.03 gallons of ammoniated water per square foot of tank cross section per minute and preferably about 0.3 gallons per minute. This emphasizes the importance of chemical reactions rather than simple mass transfer as being the dominant factor in the stage two absorption process.

The high pH solution collected in the bottom of absorber 122 is transferred through conduit 168 to the mixing chamber 169 of the stripper-oxidizer 161. There it is combined with the flow from conduit 167, which is primarily nitric acid that is produced in the gas-liquid contacting section tank 160. The two liquids are mixed rapidly in the mixing chamber and then flow from the mixing chamber across the stripper-oxidizer plate 171 and the resultant acidic ammonium nitrate product is transferred through a downcomer 173 to the bottom, or liquid collection zone of the stripper-oxidizer 161. The acidic ammonium nitrate solution is available for direct use as a fertilizer or for further processing to make another desired fertilizer product.

The flows of ammonium nitrite-nitrate solution from absorber 122 must be mixed very rapidly in stripper-oxidizer section tank 161 with the nitric acid from gas-liquid contacting section tank 160 and pH of the resultant solution must be maintained below pH 2.0 and it is best if it is maintained below pH 0.2. It is necessary to facilitate a rapid lowering of the pH upon mixing the two liquids and to maintain it below the point at which the ionic reaction of equation 9 occurs. Tests have shown that the reaction of equation 9 takes place minimally at pH's below 2.0 and above 6.7 and that it is further minimized at both lower and higher pH's. Loss of ammonium and nitrite ions as gaseous nitrogen can thus be substantially avoided by pH control, as indicated above.

Air is fed to the stripper-oxidizer section tank 161 through conduit 175 after preheating in conduit 230 of the heat exchanger 196. It is desirable to heat the air to obtain a proper stripping action and a temperature between 250 degrees and 300 degrees F. has been found to be particularly effective. The stripper tray 171 and the mixing cup 169 are perforated so as to apportion the heated air feed properly. Alternatively, when desired, the mixing-cup air feed can be taken through a suitable conduit directly from the atmosphere.

The chemistry taking place in stripper-oxidizer section tank 161 is clearly very complex but it is believed that the reaction of equations 12 and 13 are the main reactions taking place because the liquid product resulting is substantially an acidic ammonium nitrate solution and the primary nitrogen oxide exiting stripper-oxidizer section tank 161 through the conduit 166 is nitrogen dioxide.

It seems probable that the reaction of equations 10 and 11 also occur to some extent. The important thing, however, is that the reaction of equation 9, which is ionic in nature, is avoided by controlling the pH and thus the ionization of the ionic species involved in the reaction of equation 9, thereby giving efficient conversion of the oxides of nitrogen to an ammonium nitrate solution. Rapidly formed ammonium nitrite is used as a vehicle to facilitate oxide absorption while avoiding its destruction to gaseous nitrogen by pH control This destruction has repeatedly been encountered in the prior art.

The ammonium nitrite-nitrate liquid from the second absorbance stage is collected and applied with rapid mixing to the stripper-oxidizer of the first absorbance stage concomitantly with the nitric acid formed in the first stage and heated air, resulting in the formation of an acidic ammonium nitrate solution end product for application to farmlands, storage or further treatment and gases exiting the stripper-oxidizer containing nitrogen oxides principally in the form of nitrogen dioxide. These conversions are presumably accomplished in the reaction of equations twelve and thirteen. The nitrogen dioxide containing exit gases are transferred to the nitric acid forming section of the first stage and effectively recovered as nitric acid and nitric oxide in the reaction of equation 3.

Process water is transferred through the system by a water supply pump or through an irrigation water pump bypass. In the former case, the liquid fertilizer formed is transferred to a storage or processing system for subsequent use and, in the latter case, it is transferred by a pump directly to an irrigation system for application to the crop. In the embodiment in which fertilizer is made for subsequent use, concentrations are increased and provisions are made either to use the heat formed at the local site or dissipate it.

Gases are drawn through the system by a blower located after a final filter stage, causing the system to operate at a slight negative pressure. The low or negative pressure that this system is able to use enhances the conversion efficiency of all known ammonia oxidation catalysts as contrasted to the normal high pressure commercial system and particularly enhances the efficiency of the cobalt oxide catalyst. Further, a slightly negative pressure in the second stage absorber has been found to speed up and increase the yield of the reaction system for forming ammonium nitrite in the second stage and to minimize the nitrite content of the final product exiting from the stripper-oxidizer section of the system. Moreover, operation under a slightly negative pressure is a significant safety factor against noxious gas leaks, which is a serious problem with the normal commercial system. The pressure lies in the range of atmospheric pressure to seventy-five percent of atmospheric pressure referred to as a vacuum or negative pressure of one quarter of an atmosphere.

Solid ammonium nitrite and ammonium nitrate particles formed in the second stage and entrained in the exit gases of the second stage are trapped and solubilized at the final submicron particulate filter and the resulting liquid is comingled with the liquid flow from the second stage. This scrubbing is accomplished with a Brinks or similar type of filter apparatus which is well known in the art.

Absorption and conversion of nitrogen oxides in this system are the result of a simple, unique apparatus and process being used to bring about a complex series of events to establish steady-state physical and chemical non-equilibrium. Effective interfacial area, viscosity, surface tension, free space, pressure level, reaction rates, reactant concentrations and reaction mechanisms in gas and liquid phases all play key parts in the absorption rate and absorption efficiency of the system.

This process makes use of the rate at which a reaction or series of reactions moves toward the equilibrium. The establishment of non-equilibrium on a steady-state basis furnishes the driving cause in this process. The molar ratios of the oxides which are maintained in the system facilitate the rapid absorption of the nitrogen oxides. For example, reaction 2 is in the second stage a rapid reaction because a relatively high concentration of nitrogen oxide in relation to nitrogen dioxide is maintained in this system. Reactions 5 and 6 and reaction 8, which is analogous to reaction 6, are reactions that are extremely rapid and are more effectively used in the design of the second stage absorber and the product therefrom is treated in the stripper-oxidizer of the first stage to form the desired products using reactions 12 and 13.

As can be understood from the above description, this method of nitrogeneous fertilization has several advantages such as: (1) it is economical because of the low cost of transportation and equipment; (2) it is safe because it operates at slightly less than atmospheric pressure and is sufficiently small-scale so that the exothermic reactions are easily cooled and the heat generated can be easily dissipated or recovered for use at the local site; (3) it permits tailoring of the ions for specific crops at the farm level; (4) it is efficient in producing nitrate suitable for use as fertilizer; (5) it is particularly safe to operate because of the capability to operate safely under negative pressure; and (6) the tail gases are reduced to an environmentally satisfactory level.

Although a preferred embodiment has been described with some particularity, many modifications and variations in the preferred embodiment are possible without deviating from the invention. Therefore, it is to be understood that, within the scope of the appended claims, the invention may be practices other than as specifically described.

What is claimed is:

1. A process of making nitrogen solutions from ammonia comprising the steps of:
    oxidizing ammonia in air at a rate of less than 146 pounds of nitrogen per hour at a concentration of between 10% and 25% by volume of ammonia to air and at a temperature of between 1,000 and 2,000 degrees Fahrenheit in a continuous process at a pressure between atmospheric pressure and a vacuum pressure of ¼ of an atmosphere to form a continuous stream of nitrogen oxides whereby the ammonia is oxidized at a rate sufficiently slow to permit cooling by air circulation and single-pass water flow of less than 12 gallons per minute permitting the oxidation to proceed until at least equivalent quantities of nitrogen dioxide and nitric oxide are obtained;

mixing the nitrogen oxides with water at a rate of less than 12 gallons per minute to form nitric acid and nitric oxide by reaction of at least a portion of the nitrogen dioxide and water as the nitrogen oxides are formed;

flowing substantially all of the remaining nitrogen oxides and substantially all of the nitric oxide formed by the reaction of nitrogen dioxide with water to a reactor;

reacting the nitrogen oxides in the reactor with ammonium hydroxide in a continuous process at a pressure between atmospheric pressure and a vacuum pressure of ¼ of an atmosphere in a stream flowing in the range of less than 0.5 gallon each minute of ammoniated water per square foot of reactor cross section sufficiently ammoniated to provide a pH in the range of 8.0 to 8.4 passing through a mixture of nitrogen oxides in which the ratio of nitric oxide to nitrogen dioxide is greater than one to form an ammonium nitrate liquid solution at a pH above 6.7; and combining the nitric acid and the ammonium nitrite at a pH of less than 2 to form ammonium nitrate, nitrogen dioxide and water, whereby a liquid is formed which includes ammonium nitrate.

2. A process according to claim 1 further including the steps of:
converting a portion of the nitrogen dioxide which has been formed by reacting the ammonium nitrite with nitric acid to nitric acid by reacting with water and combining a portion with nitric oxide to form dinitrogen trioxide;

reacting the dinitrogen trioxide with ammonium hydroxide to form further ammonium nitrite in the reactor; and continuously mixing said ammonium nitrite formed from the dinitrogen in the reactor with nitric acid to provide a continuous process for forming ammonium nitrate until substantially all of the nitrogen oxides have been converted to liquid nitrogen solution.

3. A method according to claim 2 in which the step of combining nitric acid and ammonium nitrite includes the step of introducing air into a bath of the nitric acid while the nitric acid is being mixed with ammonium nitrite to cause turbulence.

4. A method according to claim 3 in which the step of combining includes the step of combining in a mixture in which the pH of the mixture of nitric acid and ammonium nitrite is maintained at a level of substantially 0.2, the momentum of the air introduced is sufficient to cause turbulence that maintains the pH uniform and the air is introduced at a temperature in the range of 250 to 300 degrees Fahrenheit.

5. A method according to claim 4 in which the step of combining the nitrogen oxides with water includes a step of delaying the mixing of the nitrogen oxides with water in a sufficiently large oxidation volume for a sufficient period of time to cause the molar ratio of nitrogen dioxide to nitrogen monoxide to be at least one.

6. A method according to claim 5 further including the step of using the liquid-containing ammonium nitrate as fertilizer.

7. A process according to claim 1 in which the steps are performed at a pressure not in excess of atmospheric pressure by drawing fluids from the systems, whereby the escape of gases is reduced and the process efficiency is increased.

8. A method of nitrogeneous fertilizing comprising the steps of:
preparing nitrogen oxides including nitrogen dioxide from nitrogen at a rate of less than 146 pounds of nitrogen per hour in a continuous process at a pressure between atmospheric pressure and a vacuum pressure of ¼ of an atmosphere at a substantially fixed location in the vicinity to be fertilized;

mixing the nitrogen oxides with flowing water at a rate of less than 12 gallons per minute in a continuous process as the nitrogen oxides are being formed, whereby nitric acid is formed from a portion of the nitrogen dioxide for use in a fertilizing process leading to the application of nitrogeneous fertilizer in the vicinity of the fixed location as the fertilizer is being formed; and preparing a different nitrogen solution from substantially all of the remaining nitrogen oxides and at least a portion of the nitric acid in a second continuous process at a pressure between atmospheric pressure and a vacuum pressure of ¼ of an atmosphere in a stream to prepare nitrogen fertilizer for use in said vicinity.

9. A method according to claim 8 in which:
the step of preparing nitrogen oxides includes the step of burning ammonia with the aid of a cobalt catalyst at a concentration of between 10% and 25% by volume of ammonia to air and at a temperature of between 1,000 and 2,000 degrees Fahrenheit in a continuous process;

the step of mixing nitrogen dioxide with flowing water includes the step of mixing nitrogen dioxide with flowing water at substantially atmospheric pressure; and the step of preparing at least one other nitrogen compound comprises the steps of mixing the remaining gases with ammonium hydroxide in a column at a rate in the range of less than 0.5 gallon each minute of ammonium hydroxide sufficiently ammoniated to provide a pH in the range of 8.0 to 8.4 passing through the remaining gas in which remaining gases the ratio of nitric oxide to nitrogen dioxide is maintained at a level greater than one, collecting the resulting ammonium nitrite in a liquid solution at a pH above 6.7, and converting the ammonium nitrite to a stable form.

10. A method according to claim 9 in which:
the step of mixing the remaining gases with ammonium hydroxide includes the step of mixing ammonia with water to form ammonium hydroxide;

the step of converting the ammonium nitrite to a stable form includes the step of mixing the ammonium nitrite with the nitric acid at a pH of less than 2 formed in the first chemical process; and the step of mixing the remaining gases includes the step of passing gases in counterflow with ammoniated water at a pressure not in excess of atmospheric pressure at a rate of less than 0.5 gallons per minute per square foot of cross section of the column.

11. A process according to claim 8 in which the pressure is maintained at a level in the gas and vapor phases not in excess of atmospheric pressure by drawing fluids through the system.

12. A process for converting nitrogen oxides to liquids having nitrate ions comprising the steps of:
mixing nitrogen oxides at a pH above 6.7 with a water solution of potassium hydroxide, whereby a nitrite salt of the potassium is obtained in solution; and
oxidizing the nitrite to a nitrate in a stable environment.

13. A process according to claim 12 in which the step of mixing the nitrogen oxides with a water solution includes the step of mixing the nitrogen oxides with the solution at a pH above 6.7.

14. A process according to claim 13 in which the step of mixing the nitrogen oxides with a water solution includes the step of mixing the nitrogen oxides with the solution at a pH of between 8.0 and 8.4.

15. A process according to claim 14 in which the step of oxidizing the nitrite to a nitrate includes the step of oxidizing the nitrite to a nitrate at a pH of less than 2.

16. A process for converting nitrogen oxides to liquids having nitrate ions comprising the steps of:
mixing nitrogen oxides at a pH above 6.7 with a water solution of a base formed of a cation and a hydroxyl group, whereby a nitrite salt of the cation is obtained in solution;
oxidizing the nitrite to a nitrate in a stable environment;
the step of oxidizing the nitrite to a nitrate including the step of oxidizing the nitrite to a nitrate at a pH of less than 2;
the step of mixing the nitrogen oxides with a water solution including the step of mixing the nitrogen oxides with the solution under conditions which remove dinitrogen trioxide at a sufficient rate to prevent the equilibrium reaction state between the formation of nitrogen dioxide from nitric oxide and the formation of dinitrogen trioxide from stabilizing, whereby dinitrogen trioxide continues to be formed at a rapid rate.

17. A process according to claim 16 in which the step of mixing the nitrogen oxides with a water solution includes the step of mixing the nitrogen oxides with the solution under conditions which remove dinitrogen trioxide at a rate which maintains the mole ratio of nitric oxide to nitrogen dioxide larger than 1.

18. A process according to claim 17 in which the step of mixing the nitrogen oxides with a water solution includes the step of mixing the nitrogen oxides with the solution under conditions which remove dinitrogen trioxide at a rate at least equal to the rate at which nitric oxide is being oxidized to nitrogen dioxide.

19. A process according to claim 18 in which the step of mixing the nitrogen oxides with a water solution includes the step of mixing the nitrogen oxides with ammonium hydroxide.

20. A process according to claim 19 in which the step of mixing the nitrogen oxides with ammonium hydroxide includes the steps of:
mixing water and ammonia to form ammonium hydroxide; and
flowing the ammonium hydroxide through a column containing the oxides at a flow rate of less than 0.5 gallons per minute per square foot of column cross-section.

21. A process according to claim 20 in which the step of oxidizing the nitrite to a nitrate includes the step of mixing the nitrite with nitric acid.

22. A process according to claim 21 in which the step of mixing the nitrite with nitric acid includes the step of rapidly mixing the mixture of nitric acid and nitrite to maintain a substantially uniform pH and to release nitrogen dioxide.

23. A process according to claim 22 including the steps of:
converting a portion of the nitrogen dioxide released by the oxidation of the nitrite in nitric acid to nitric acid and converting another portion to dinitrogen trioxide by mixing with nitric oxide; and
reacting the dinitrogen trioxide with ammonium hydroxide to form ammonium nitrite.

24. A process according to claim 23 further including the step of using the solution formed during the oxidation of nitrite as a liquid nitrogen fertilizer.

25. A process according to claim 22 in which the step of using the solution includes the step of using the nitrate solution as a fertilizer at a rate of less than 146 pounds an hour of nitrogen.

* * * * *